US012230286B2

(12) United States Patent
Helmrich et al.

(10) Patent No.: US 12,230,286 B2
(45) Date of Patent: *Feb. 18, 2025

(54) DECODER FOR DECODING AN ENCODED AUDIO SIGNAL AND ENCODER FOR ENCODING AN AUDIO SIGNAL

(71) Applicant: Fraunhofer-Gesellschaft zur Foerderung der angewandten Forschung e.V., Munich (DE)

(72) Inventors: Christian Helmrich, Berlin (DE); Bernd Edler, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,741

(22) Filed: Nov. 16, 2023

(65) Prior Publication Data

US 2024/0096336 A1 Mar. 21, 2024

Related U.S. Application Data

(63) Continuation of application No. 17/722,027, filed on Apr. 15, 2022, now Pat. No. 11,854,559, which is a (Continued)

(30) Foreign Application Priority Data

Mar. 9, 2015 (EP) .................................... 15158236
Jun. 17, 2015 (EP) .................................... 15172542

(51) Int. Cl.
*G10L 19/02* (2013.01)
*G10L 19/008* (2013.01)
(Continued)

(52) U.S. Cl.
CPC ........ *G10L 19/0212* (2013.01); *G10L 19/008* (2013.01); *G10L 19/032* (2013.01); *G10L 19/18* (2013.01)

(58) Field of Classification Search
None
See application file for complete search history.

(56) References Cited

U.S. PATENT DOCUMENTS 5,327,366 A 7/1994 Mau
5,394,473 A 2/1995 Davidson
(Continued)

FOREIGN PATENT DOCUMENTS

CN 1447285 A 10/2003
CN 1481546 A 3/2004
(Continued)

OTHER PUBLICATIONS

"Information technology—MPEG audio technologies—Part 3: Unified speech and audio coding", ISO/IEC FDIS 23003-3:2011(E), ISO/IEC JTC 1/SC 29/WG 11. Sep. 20, 2011, Sep. 20, 2011, 286 pp.
(Continued)

*Primary Examiner* — Qin Zhu
(74) *Attorney, Agent, or Firm* — Perkins Coie LLP; Michael A. Glenn

(57) ABSTRACT

A schematic block diagram of a decoder for decoding an encoded audio signal is shown. The decoder includes an adaptive spectrum-time converter and an overlap-add-processor. The adaptive spectrum-time converter converts successive blocks of spectral values into successive blocks of time values, e.g. via a frequency-to-time transform. Furthermore, the adaptive spectrum-time converter receives a control information and switches, in response to the control information, between transform kernels of a first group of transform kernels including one or more transform kernels (Continued)

having different symmetries at sides of a kernel, and a second group of transform kernels including one or more transform kernels having the same symmetries at sides of a transform kernel. Moreover, the overlap-add-processor overlaps and adds the successive blocks of time values to obtain decoded audio values, which may be a decoded audio signal.

16 Claims, 22 Drawing Sheets

Related U.S. Application Data continuation of application No. 16/899,406, filed on Jun. 11, 2020, now Pat. No. 11,335,354, which is a continuation of application No. 16/271,380, filed on Feb. 8, 2019, now Pat. No. 10,706,864, which is a continuation of application No. 15/696,934, filed on Sep. 6, 2017, now Pat. No. 10,236,008, which is a continuation of application No. PCT/EP2016/054902, filed on Mar. 8, 2016.

(51) Int. Cl.

| | |
|---|---|
| ***G10L 19/032*** | (2013.01) |
| ***G10L 19/18*** | (2013.01) |

(56) References Cited

U.S. PATENT DOCUMENTS

| | | | |
|---|---|---|---|
| 5,890,106 | A | 3/1999 | Bosi-Goldberg |
| 6,199,039 | B1 | 3/2001 | Chen et al. |
| 6,496,795 | B1 | 12/2002 | Malvar |
| 6,980,933 | B2 | 12/2005 | Cheng et al. |
| 8,155,954 | B2 | 4/2012 | Edler et al. |
| 8,595,019 | B2 | 11/2013 | Geiger et al. |
| 2002/0118845 | A1 | 8/2002 | Henn et al. |
| 2003/0093282 | A1 | 5/2003 | Goodwin |
| 2003/0187528 | A1 | 10/2003 | Chu et al. |
| 2005/0149339 | A1 | 7/2005 | Tanaka et al. |
| 2005/0165587 | A1 | 7/2005 | Cheng et al. |
| 2005/0265445 | A1 | 12/2005 | Xin et al. |
| 2006/0023958 | A1 | 2/2006 | Malvar |
| 2007/0067162 | A1 | 3/2007 | Villemoes et al. |
| 2009/0012797 | A1 | 1/2009 | Boehm et al. |
| 2010/0013987 | A1 | 1/2010 | Edler et al. |
| 2010/0161319 | A1 | 6/2010 | Elder et al. |
| 2011/0060433 | A1 | 3/2011 | Dai et al. |
| 2011/0173010 | A1 | 7/2011 | Lecomte et al. |
| 2012/0093426 | A1 | 4/2012 | Sato |
| 2013/0028426 | A1 | 1/2013 | Purnhagen et al. |
| 2013/0030819 | A1 | 1/2013 | Purnhagen et al. |
| 2013/0121411 | A1 | 5/2013 | Robillard et al. |
| 2013/0166307 | A1 | 6/2013 | Vernon |
| 2014/0161195 | A1 | 6/2014 | Karkkainen et al. |

FOREIGN PATENT DOCUMENTS

| | | | |
|---|---|---|---|
| CN | 101025919 | A | 8/2007 |
| CN | 101325060 | A | 12/2008 |
| CN | 103098126 | A | 5/2013 |
| EP | 2650876 | A1 | 10/2013 |
| EP | 2673776 | A1 | 12/2013 |
| EP | 2673776 | B1 | 6/2015 |
| JP | H05110868 | A | 4/1993 |
| JP | H05506345 | A | 9/1993 |
| JP | 2008501250 | A | 1/2008 |
| JP | 2013528822 | A | 7/2013 |
| RU | 2374703 | C2 | 11/2009 |
| RU | 2451998 | C2 | 5/2012 |
| RU | 2515704 | C2 | 5/2014 |
| TW | 200818700 | A | 4/2008 |
| TW | 201433147 | A | 8/2014 |
| TW | 201440501 | A | 10/2014 |
| WO | 9116769 | A1 | 10/1991 |
| WO | 2004013839 | A1 | 2/2004 |
| WO | 2008014853 | A1 | 2/2008 |
| WO | 2013107602 | A1 | 7/2013 |

OTHER PUBLICATIONS

Britanak, V. , “A Unified Fast Computation of the Evenly and Oddly Stacked MDCT-MDST”, 4th EURASIP Conference, Jul. 2-5, 2003, Croatia, XP10650136A.

Dick, Sascha , et al., “Discrete Multi-Channel Coding Tool for MPEG-H 3D Audio”, International Organisation for Standardisation, ISO/IEC JTC1/SC29/WG11, Coding of Moving Pictures and AudioNo. M36591; XP030064959, 22 pp.

Helmrich, Christian , et al., “Signal-Adaptive Transform Kernel Switching for Stereo Audio Coding”, IEEE Workshop on Applications of Signal Processing to Audio and Acoustics, pp. 1-5.

Li, Tan , et al., “A unified computing kernal for MDCT/IMDCT i modern audio coding standards”, Tan Li, R. Zhang, R. Yang, Heyun Huang and Fuhuei Lin, “A unified computing kernel for MDCT/IMDCT in modern audio coding standards,” 2007 International Symposium on Communications and Information Technologies, Sydney,. NSW, 2007, pp. 1-5.

Malvar, Henrique , “A Modulated Complex Lapped Transform and its Applications to Audio Processing”, Published in the IEEE International Conference on Acoustics, Speech, and Signal Processing, Phoenix, AZ, pp. 1421-1424, Mar. 1999., pp. 1-4.

Malvar, Henrique S, “Lapped Transforms for Efficient Transform/Subband Coding”, IEEE Transactions on Acoustics, Speech, and Signal Processing, vol. 38 No. 6,, Jun. 1990, pp. 969-978.

Neuendorf, Max , et al., “MPEG unified speech and audio coding-the ISO/MPEG standard for high-efficiency audio coding of all content types”, Audio Engineering Society Convention 132 (Apr. 29, 2012), Budapest, 2012., 22 pp.

Neuendorf, Max , et al., “The ISO/MPEG Unified Speech and Audio Coding Standard-Consistent High Quality for all Content Types and at all Bit Rates”, J. Audio Eng. Soc., vol. 61, No. 12, pp. 956-977.

Princen, J. P, et al., “Subband/Transform Coding Using Filter Bank Designs Based on Time Domain Aliasing Cancellation”, IEEE ICASSP, vol. 12, 1987, pp. 2161-2163.

Princen, John P, et al., “Analysis/Synthesis Filter Bank Design Based on Time Domain Aliasing Cancellation”, IEEE Transactions on Acoustics, Speech, and Signal Processing, vol. ASSP-34, No. 5, Oct. 1986, pp. 1153-1161.

Unknown , “Modified Discrete Cosine Transform”, Wikipedia.org [database online], [retrieved on Sep. 22, 2017] Retrieved from Wikipedia using Internet <URL: https://en.wikipedia.org/wiki/Modified_discrete_cosine_transform>.

Vinton, Mark S, et al., “A Scalable and Progressive Audio Codec”, IEEE International Conference on Acoustics, Speech, and Signal Processing 2001, May 7-11, 2001, Salt Lake City, Utah, pp. 1-4.

Wang, Ye , et al., “On the relationship between MDCT, SDFT and DFT”, “On the relationship between MDCT, SDPT and DFT,” WCC 2000-ICSP 2000. 2000 5th International Conference on Signal Processing Proceedings. 16th World Computer Congress 2000, Beijing, 2000, pp. 44-47 vol. 1., pp. 1-4.

WIPO , “International Preliminary Report PCT/EP2016/054902”, International Preliminary Report mailed Jul. 7, 2017 for International Patent Application No. PCT/EP2016/054902.

WIPO , “International Search Report and Written Opinion PCT/EP2016/054902”, International Search Report and Written Opinion mailed Jun. 3, 2016 for International Patent Application No. PCT/EP2016/054902.

Xu, Hua-Jie , et al., “Recursive IMDCT Implementation on FPGA Based on AC-3 Digital Audio Decoding”, 1 Department of Electronic Science and Technology, University of Science and Technology of China, Hefei 230027, China; 2 Department of Electronic Engineering, Chizhou College, Chizhou 247000, China), pp. 167-170.

(AUDIO ENCODER)

(AUDIO ENCODER SIDE)

$$\begin{bmatrix} M \\ D \end{bmatrix} = \frac{1}{2} \begin{bmatrix} 1 & 1 \\ 1-\alpha & -1-\alpha \end{bmatrix} \begin{bmatrix} L \\ R \end{bmatrix}$$

(AUDIO ENCODER SIDE)

$$M = \frac{1}{2}(L+R)$$

$$S = \frac{1}{2}(L-R)$$

(COMBINATION RULE)

(AUDIO DECODER SIDE)

$$\begin{bmatrix} L \\ R \end{bmatrix} = \begin{bmatrix} 1+\alpha & 1 \\ 1-\alpha & -1 \end{bmatrix} \begin{bmatrix} M \\ D \end{bmatrix}$$

(AUDIO DECODER SIDE)

L=M+S

R=M-S (INVERSE COMBINATION RULE)

(ENCODER SIDE)

(DECODER SIDE)

(ENCODER SIDE)

(DECODER SIDE)

DECODER FOR DECODING AN ENCODED AUDIO SIGNAL AND ENCODER FOR ENCODING AN AUDIO SIGNAL

CROSS-REFERENCE TO RELATED APPLICATIONS

This application is a continuation of copending U.S. patent application Ser. No. 17/722,027 filed Apr. 15, 2022, which is a continuation of U.S. patent application Ser. No. 16/899,406, filed Jun. 11, 2020 (U.S. Pat. No. 11,335,354 issued May 17, 2022), which in turn is a continuation of U.S. patent application Ser. No. 16/271,380, filed Feb. 8, 2019 (U.S. Pat. No. 10,706,864 issued Jul. 7, 2020), which in turn is a continuation of U.S. patent application Ser. No. 15/696,934, filed Sep. 6, 2017 (U.S. Pat. No. 10,236,008 issued Mar. 19, 2019), which in turn is a continuation of International Application No. PCT/EP2016/054902, filed Mar. 8, 2016, which is incorporated herein by reference in its entirety, and additionally claims priority from European Applications Nos. EP 15158236.8, filed Mar. 9, 2015 and EP 15172542.1, filed Jun. 17, 2015, which are all incorporated herein by reference in their entirety.

The present invention relates to a decoder for decoding an encoded audio signal and an encoder for encoding an audio signal. Embodiments show a method and an apparatus for signal-adaptive transform kernel switching in audio coding. In other words, the present invention relates to audio coding and, in particular, to perceptual audio coding by means of lapped transforms such as e.g. the modified discrete cosine transform (MDCT) [1].

BACKGROUND OF THE INVENTION

All contemporary perceptual audio codecs, including MP3, Opus (Celt), the HE-AAC family, and the new MPEG-H 3D Audio and 3GPP Enhanced Voice Services (EVS) codecs, employ the MDCT for spectral-domain quantization and coding of one or more channel waveforms. The synthesis version of this lapped transform, using a length-M spectrum spec[ ] is given by $$x_{i,n} = C\sum_{k=0}^{M-1} spec[i][k]\cos\left(\frac{2\pi}{N}(n+n_0)\left(k+\frac{1}{2}\right)\right) \tag{1}$$

with M=N/2 and N being the time-window length. After windowing, the time output $x_{i,n}$ is combined with the previous time output $x_{i-1,n}$ by way of an overlap-and-add (OLA) process. C may be a constant parameter being greater than 0 or less than or equal to 1, such as e.g. 2/N.

While the MDCT of (1) works well for high-quality audio coding of arbitrarily many channels at various bitrates, there are two cases in which the coding quality may fall short. These are e.g.

- highly harmonic signals with certain fundamental frequencies which are, via MDCT, sampled such that each harmonic is represented by more than one MDCT bin. This leads to suboptimal energy compaction in the spectral domain, i.e. low coding gain.
- stereo signals with roughly 90 degrees of phase shift between the channels' MDCT bins, which can't be exploited by traditional M/S-stereo based joint channel coding. More sophisticated stereo coding involving coding of inter-channel phase difference (IPD) can be achieved e.g. using HE-AAC's Parametric Stereo or MPEG Surround, but such tools operate in a separate filter bank domain, which increases complexity.

Several scientific papers and articles mention MDCT or MDST-like operations, sometimes with different naming such as "lapped orthogonal transform (LOT)", "extended lapped transform (ELT)" or "modulated lapped transform (MLT)". Only [4] mentions several different lapped transforms at the same time, but does not overcome the aforementioned drawbacks of the MDCT.

Therefore, there is a need for an improved approach.

SUMMARY

According to an embodiment, a decoder for decoding an encoded audio signal may have: an adaptive spectrum-time converter for converting successive blocks of spectral values into successive blocks of time values; and an overlap-add-processor for overlapping and adding the successive blocks of time values to acquire decoded audio values, wherein the adaptive spectrum-time converter is configured to receive a control information and to signal-adaptively change, in response to the control information, between a transform kernel of a first group of transform kernels including one or more transform kernels including different symmetries at sides of the transform kernel of the first group of transform kernels, and a transform kernel of a second group of transform kernels including one or more transform kernels including equal symmetries at the sides of the transform kernel of the second group of transform kernels.

According to another embodiment, an encoder for encoding an audio signal may have: an adaptive time-spectrum converter for converting overlapping blocks of time values into successive blocks of spectral values; and a controller for controlling the adaptive time-spectrum converter to signal-adaptively change between transform kernels of a first group of transform kernels and transform kernels of a second group of transform kernels, wherein the adaptive time-spectrum converter is configured to receive a control information and to signal-adaptively change, in response to the control information, between a transform kernel of a first group of transform kernels including one or more transform kernels including different symmetries at sides of the transform kernel of the first group of transform kernels, and a transform kernel of a second group of transform kernels including one or more transform kernels including equal symmetries at the sides of the transform kernel of the second group of transform kernels.

According to yet another embodiment, a method of decoding an encoded audio signal may have the steps of: spectrum-time converting successive blocks of spectral values into successive blocks of time values; and overlapping and adding successive blocks of time values to acquire decoded audio values, receiving a control information and signal-adaptively changing, in response to the control information, in the spectrum-time converting, between a transform kernel of a first group of transform kernels including one or more transform kernels including different symmetries at sides of the transform kernel of the first group of transform kernels, and a transform kernel of a second group of transform kernels including one or more transform kernels including equal symmetries at the sides of the transform kernel of the second group of transform kernels.

According to still another embodiment, a method of encoding an audio signal may have the steps of: time-spectrum converting overlapping blocks of time values into successive blocks of spectral values; receiving a control information; and signal-adaptively changing, in response to the control information, in the time-spectrum converting, between a transform kernel of a first group of transform kernels including one or more transform kernels including different symmetries at sides of the transform kernel of the first group of transform kernels, and a transform kernel of a second group of transform kernels including one or more transform kernels including equal symmetries at the sides of the transform kernel of the second group of transform kernels.

According to another embodiment, a non-transitory digital storage medium may have a computer program stored thereon to perform the method of decoding an encoded audio signal, which method may have the steps of: spectrum-time converting successive blocks of spectral values into successive blocks of time values; overlapping and adding successive blocks of time values to acquire decoded audio values; and receiving a control information and signal-adaptively changing, in response to the control information, in the spectrum-time converting, between a transform kernel of a first group of transform kernels including one or more transform kernels including different symmetries at sides of the transform kernel of the first group of transform kernels, and a transform kernel of a second group of transform kernels including one or more transform kernels including equal symmetries at the sides of the transform kernel of the second group of transform kernels, when said computer program is run by a computer.

According to another embodiment, a non-transitory digital storage medium may have a computer program stored thereon to perform the method of encoding an audio signal, which method may have the steps of: time-spectrum converting overlapping blocks of time values into successive blocks of spectral values; receiving a control information; and signal-adaptively changing, in response to the control information, in the time-spectrum converting, between a transform kernel of a first group of transform kernels including one or more transform kernels including different symmetries at sides of the transform kernel of the first group of transform kernels, and a transform kernel of a second group of transform kernels including one or more transform kernels including equal symmetries at the sides of the transform kernel of the second group of transform kernels, when said computer program is run by a computer.

The present invention is based on the finding that a signal-adaptive change or substitution of the transform kernel may overcome the aforementioned kinds of issues of the present MDCT coding. According to embodiments, the present invention addresses the above two issues concerning conventional transform coding by generalizing the MDCT coding principle to include three other similar transforms. Following the synthesis formulation of (1), this proposed generalization shall be defined as $$x_{i,n} = \frac{2}{N}\sum_{k=0}^{\frac{N}{2}-1} spec[i][k]cs\left(\frac{2\pi}{N}(n+n_0)(k+k_0)\right) \quad (2)$$

Note that the ½ constant has been replaced by a $k_0$ constant and that the cos( . . . ) function has been substituted by a cs( . . . ) function. Both $k_0$ and cs( . . . ) are chosen signal- and context-adaptively.

According to embodiments, the proposed modification of the MDCT coding paradigm can adapt to instantaneous input characteristics on per-frame basis, such that for example the previously described issues or cases are addressed.

Embodiments show a decoder for decoding an encoded audio signal. The decoder comprises an adaptive spectrum-time converter for converting successive blocks of spectral values into successive blocks of time values, e.g. via a frequency-to-time transform. The decoder further comprises an overlap-add-processor for overlapping and adding successive blocks of time values to obtain decoded audio values. The adaptive spectrum-time converter is configured to receive a control information and to switch, in response to the control information, between transform kernels of a first group of transform kernels comprising one or more transform kernels having different symmetries at sides of a kernel, and a second group of transform kernels comprising one or more transform kernels having the same symmetries at sides of a transform kernel. The first group of transform kernels may comprise one or more transform kernels having an odd symmetry at a left side and an even symmetry at the right side of the transform kernel or vice versa, such as for example an inverse MDCT-IV or an inverse MDST-IV transform kernel. The second group of transform kernels may comprise transform kernels having an even symmetry at both sides of the transform kernel or an odd symmetry at both sides of the transform kernel, such as for example an inverse MDCT-II or an inverse MDST-II transform kernel. The transform kernel types II and IV will be described in greater detail in the following.

Therefore, for highly harmonic signals having a pitch at least nearly equal to an integer multiple of the frequency resolution of the transform, which may be the bandwidth of one transform bin in the spectral domain, it is advantageous to use a transform kernel of the second group of transform kernels, for example the MDCT-II or the MDST-II, for coding the signal when compared to coding the signal with the classical MDCT. In other words, using one of the MDCT-II or MDST-II is advantageous to encode a highly harmonic signal being close to an integer multiple of the frequency resolution of the transform when compared to the MDCT-IV.

Further embodiments show the decoder being configured to decode multichannel signals, such as for example stereo signals. For stereo signals, for example, a mid/side (M/S)-stereo processing is usually superior to the classical left/right (L/R)-stereo processing. However, this approach does not work or is at least inferior, if both signals have a phase shift of 90° or 270°. According to embodiments, it is advantageous to code one of the two channels with an MDST-IV based coding and still using the classical MDCT-IV coding to encode the second channel. This leads to a phase shift of 90° between those two channels incorporated by the encoding scheme which compensates the 90° or 270° phase shift of the audio channels.

Further embodiments shown an encoder for encoding an audio signal. The encoder comprises an adaptive time-spectrum converter for converting overlapping blocks of time values into successive blocks of spectral values. The encoder further comprises a controller for controlling the time-spectrum converter to switch between transform kernels of a first group of transform kernels and transform kernels of a second group of transform kernels. Therefore, the adaptive time-spectrum converter receives a control information and switches, in response to the control information, between transform kernels of a first group of transform kernels comprising one or more transform kernels having different symmetries at sides of a kernel, and a second group of transform kernels comprising one or more transform kernels having the same symmetries at sides of a transform kernel. The encoder may be configured to apply the different transform kernels with respect to an analysis of the audio signal. Therefore, the encoder may apply the transform kernels in a way already described with respect to the decoder, where, according to embodiments, the encoder applies the MDCT or MDST operations and the decoder applies the related inverse operations, namely the IMDCT or IMDST transforms. The different transform kernels will be described in detail in the following.

According to a further embodiment, the encoder comprises an output interface for generating an encoded audio signal having, for a current frame, a control information indicating a symmetry of the transform kernel used for generating the current frame. The output interface may generate the control information for the decoder being able to decode the encoded audio signal with the correct transform kernel. In other words, the decoder has to apply the inverse transform kernel of the transform kernel used by the encoder to encode the audio signal in each frame and channel. This information may be stored in the control information and transmitted from the encoder to the decoder for example using a control data section of a frame of the encoded audio signal.

BRIEF DESCRIPTION OF THE DRAWINGS

Embodiments of the present invention will be detailed subsequently referring to the appended drawings, in which.

DETAILED DESCRIPTION OF THE INVENTION

In the following, embodiments of the invention will be described in further detail. Elements shown in the respective figures having the same or similar functionality will have associated therewith the same reference signs.

Figure 1:
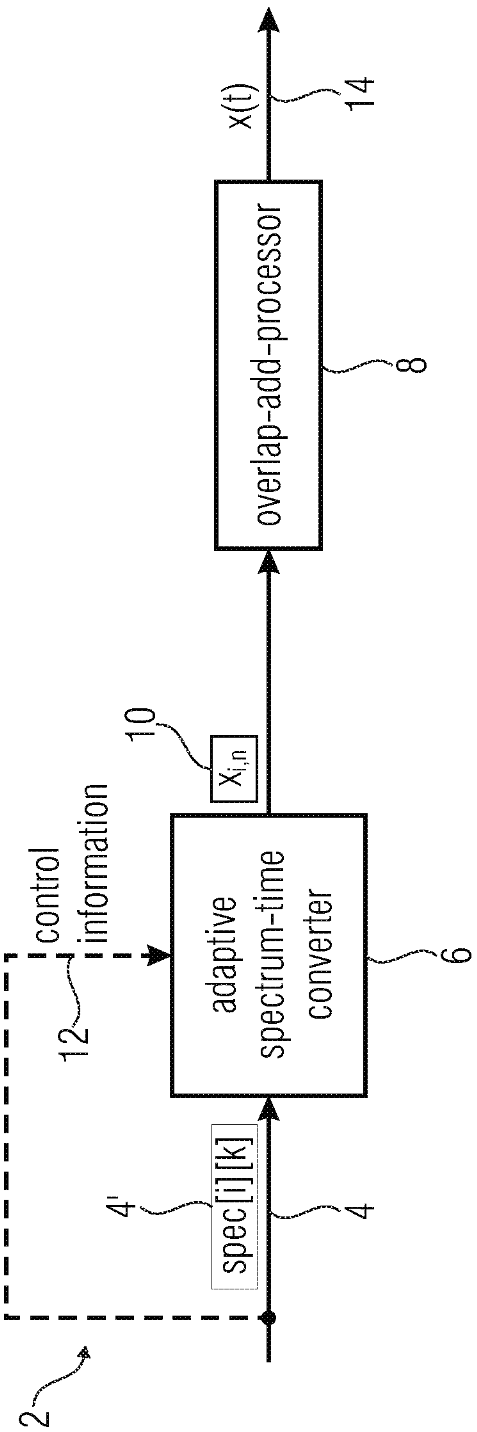
FIG. 1 shows a schematic block diagram of a decoder for decoding an encoded audio signal.

FIG. 1 shows a schematic block diagram of a decoder 2 for decoding an encoded audio signal 4. The decoder comprises an adaptive spectrum-time converter 6 and an overlap-add-processor 8. The adaptive spectrum-time converter converts successive blocks of spectral values 4' into successive blocks of time values 10 e.g. via a frequency-to-time transform. Furthermore, the adaptive spectrum-time converter 6 receives a control information 12 and switches, in response to the control information 12, between transform kernels of a first group of transform kernels comprising one or more transform kernels having different symmetries at sides of a kernel, and a second group of transform kernels comprising one or more transform kernels having the same symmetries at sides of a transform kernel.

Moreover, the overlap-add-processor 8 overlaps and adds the successive blocks of time values 10 to obtain decoded audio values 14, which may be a decoded audio signal.

According to embodiments, the control information 12 may comprise a current bit indicating a current symmetry for a current frame, wherein the adaptive spectrum-time converter 6 is configured to not switch from the first group to the second group, when the current bit indicates the same symmetry as was used in a preceding frame. In other words, if e.g. the control information 12 indicates using a transform kernel of the first group for the previous frame and if the current frame and the previous frame comprise the same symmetry, e.g. indicated if the current bit of the current frame and the previous frame have the same state, a transform kernel of the first group is applied, meaning that the adaptive spectrum-time converter does not switch from the first to the second group of transform kernels. The other way round, i.e. to stay in the second group or to not switch from the second group to the first group, the current bit indicating the current symmetry for the current frame indicates a different symmetry as was used in the preceding frame. In other words, if the current and the previous symmetry is equal and if the previous frame was encoded using a transform kernel from the second group, the current frame is decoded using an inverse transform kernel of the second group.

Furthermore, if the current bit indicating a current symmetry for the current frame indicates a different symmetry as was used in the preceding frame, the adaptive spectrum-time converter 6 is configured to switch from the first group to the second group. More specifically, the adaptive spectrum-time converter 6 is configured to switch the first group into the second group, when the current bit indicating a current symmetry for the current frame indicates a different symmetry as was used in the preceding frame. Furthermore, the adaptive spectrum-time converter 6 may switch the second group into the first group, when the current bit indicating a current symmetry for the current frame indicates the same symmetry as was used in the preceding frame. More specifically, if a current and a previous frame comprise the same symmetry, and if the previous frame was encoded using a transform kernel of the second group of transform kernels, the current frame may be decoded using a transform kernel of the first group of transform kernels. The control information 12 may be derived from the encoded audio signal 4 or received via a separate transmission channel or carrier signal as will be clarified in the following. Moreover, the current bit indicating a current symmetry of a current frame may be a symmetry of the right side of the transform kernels.

The 1986 article by Princen and Bradley [2] describes two lapped transforms employing a trigonometric function which is either the cosine function or the sine function. The first one, which is called "DCT based" in that article, can be obtained using (2) by setting cs( )=cos( ) and $k_0=0$, the second one, referred to as "DST based", is defined by (2) when cs( )=sin( ) and $k_0=1$. Due to their respective similarities to the DCT-II and DST-II often used in image coding, these particular cases of the general formulation of (2) shall be declared as "MDCT type II" and "MDST type II" transforms, respectively, in this document. Princen and Bradley continued their investigation in a 1987 paper [3] in which they propose the common case of (2) with cs( )=cos( ) and $k_0=0.5$, which was introduced in (1) and which is generally known as "the MDCT". For the sake of clarification and due to its relationship with the DCT-IV, this transform shall be referred to as "MDCT type IV" herein. The observant reader will already have identified a remaining possible combination, called "MDST type IV", being based on the DST-IV and obtained using (2) with cs( )=sin( ) and $k_0=0.5$. Embodiments describe when and how to switch signal-adaptively between these four transforms.

It is worth defining some rules as to how the inventive switching between the four different transform kernels can be achieved such that the perfect reconstruction property (identical reconstruction of the input signal after analysis and synthesis transformation in the absence of spectral quantization or other introduction of distortion), as noted in [1-3], is retained. To this end, a look at the symmetrical extension properties of the synthesis transforms according to (2) is useful, which is illustrated with respect to FIG. 6.

- The MDCT-IV shows odd symmetry at its left and even symmetry at its right side; a synthesized signal is inverted at its left side during signal fold-out of this transform.
- The MDST-IV shows even symmetry at its left and odd symmetry at its right side; a synthesized signal is inverted at its right side during signal fold-out of this transform.
- The MDCT-II shows even symmetry at its left and even symmetry at its right side; a synthesized signal is not inverted at any side during signal fold-out of this transform.
- The MDST-II exhibits odd symmetry at its left and odd symmetry at its right side; a synthesized signal is inverted at both sides during signal fold-out of this transform.

Furthermore, two embodiments for deriving the control information 12 in the decoder are described. The control information may comprise e.g. a value of $k_0$ and cs( ) to indicate one of the four above-mentioned transforms. Therefore, the adaptive spectrum-time converter may read from the encoded audio signal the control information for a previous frame and a control information for a current frame following the previous frame from the encoded audio signal in a control data section for the current frame. Optionally, the adaptive spectrum-time converter 6 may read the control information 12 from the control data section for the current frame and retrieve the control information for the previous frame from a control data section of the previous frame or from a decoder setting applied to the previous frame. In other words, a control information may be derived directly from the control data section, e.g. in a header, of the current frame or from the decoder setting of the previous frame.

In the following, the control information exchanged between an encoder and the decoder is described according to an embodiment. This section describes how the side-information (i.e. control information) may be signaled in a coded bit-stream and used to derive and apply the appropriate transform kernels in a robust (e.g. against frame loss) way.

According to an embodiment, the present invention may be integrated into the MPEG-D USAC (Extended HE-AAC) or MPEG-H 3D Audio codec. The determined side-information may be transmitted within a so-called fd_channel_stream element, which is available for each frequency-domain (FD) channel and frame. More specifically, a one-bit currAliasingSymmetry flag is written (by an encoder) and read (by a decoder) right before or after the scale_factor_data( ) bitstream element. If the given frame is an independent frame, i.e. indepFlag==1, another bit, prevAliasingSymmetry, is written and read. This ensures that both the left-side and right-side symmetries, and thus the resulting transform kernel to be used within said frame and channel, can be identified in the decoder (and decoded properly) even if the previous frame is lost during the bitstream transmission. If the frame is not an independent frame, prevAliasingSymmetry is not written and read, but set equal to the value which currAliasingSymmetry held in the previous frame. According to further embodiments, different bits or flags may be used to indicate the control information (i.e. the side-information).

Next, respective values for cs( ) and $k_0$ are derived from the flags currAliasingSymmetry and prevAliasingSymmetry, as specified in Table 1, where currAliasingSymmetry is abbreviated $symm_i$ and prevAliasingSymmetry is abbreviated $symm_{i-1}$. In other words, $symm_i$ is the control information for the current frame at index i and $symm_{i-1}$ is the control information for the previous frame at index i−1. Table 1 shows a decoder-side decision matrix specifying the values of $k_0$ and cs( . . . ) based on transmitted and/or otherwise derived side-information with regard to symmetry. Therefore, the adaptive spectrum-time converter may apply the transform kernel based on Table 1.

TABLE 1

| | current frame i | |
|---|---|---|
| last frame i − 1 | right-side symmetry even ($symm_i = 0$) | right-side symmetry odd ($symm_i = 1$) |
| right-side symmetry odd ($symm_{i-1} = 1$) | cs(. . .) = cos(. . .) $k_0 = 0.0$ | cs(. . .) = sin(. . .) $k_0 = 0.5$ |
| right-side symmetry even ($symm_{i-1} = 0$) | cs(. . .) = cos(. . .) $k_0 = 0.5$ | cs(. . .) = sin(. . .) $k_0 = 1.0$ |

Lastly, once cs( ) and $k_0$ have been determined in the decoder, the inverse transform for the given frame and channel may be carried out with the appropriate kernel using equation (2). Prior to and after this synthesis transform, the decoder may operate as usual in the state of the art, also with respect to windowing.

Figure 2:
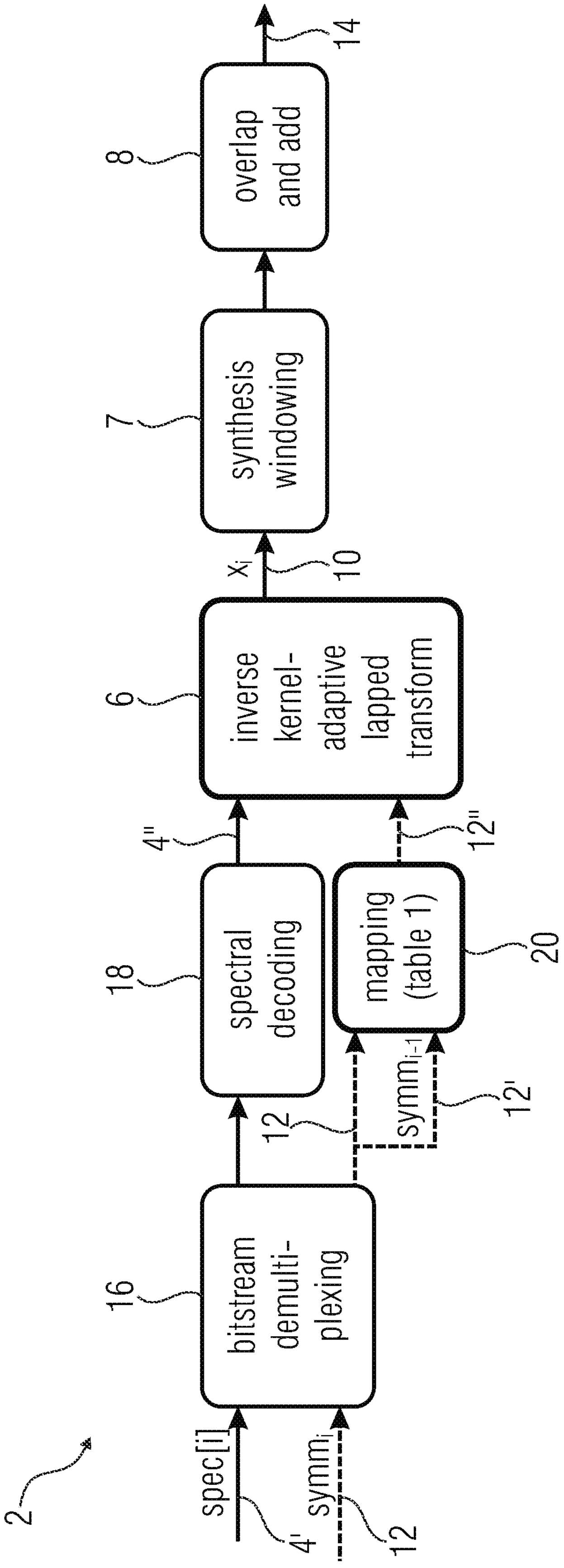
FIG. 2 shows a schematic block diagram illustrating the signal flow in the decoder according to an embodiment.

FIG. 2 shows a schematic block diagram illustrating the signal flow in the decoder according to an embodiment, where a solid line indicates the signal and a dashed line indicates side-information, i indicates a frame index, and xi indicates a frame time-signal output. Bitstream demultiplexer 16 receives the successive blocks of spectral values 4' and the control information 12. According to an embodiment, the successive blocks of spectral values 4' and the control information 12 are multiplexed into a common signal, wherein the bitstream demultiplexer is configured to derive the successive blocks of spectral values and the control information from the common signal. The successive blocks of spectral values may further be input to a spectral decoder 18. Furthermore, the control information for a current frame 12 and a previous frame 12' are input to the mapper 20 to apply the mapping shown in table 1. According to embodiments, the control information for the previous frame 12' may be derived from the encoded audio signal, i.e. the previous block of spectral values, or using the current preset of the decoder which was applied for the previous frame. The spectrally decoded successive blocks of spectral values 4" and the processed control information 12' comprising the parameters cs and $k_0$ are input to an inverse kernel-adaptive lapped transformer, which may be the adaptive spectrum-time converter 6 from FIG. 1. Output may be the successive blocks of time values 10, which may optionally be processed using a synthesis window 7, for example to overcome discontinuities at the boundaries of the successive blocks of time values, before being input to the overlap-add-processor 8 for performing an overlap-add algorithm to derive the decoded audio value 14. The mapper 20 and the adaptive spectrum-time converter 6 may be further moved to another position of the decoding of the audio signal. Therefore, the location of these blocks is only a proposal. Moreover, the control information may be calculated using a corresponding encoder, an embodiment thereof is for example described with respect to FIG. 3.

Figure 3:
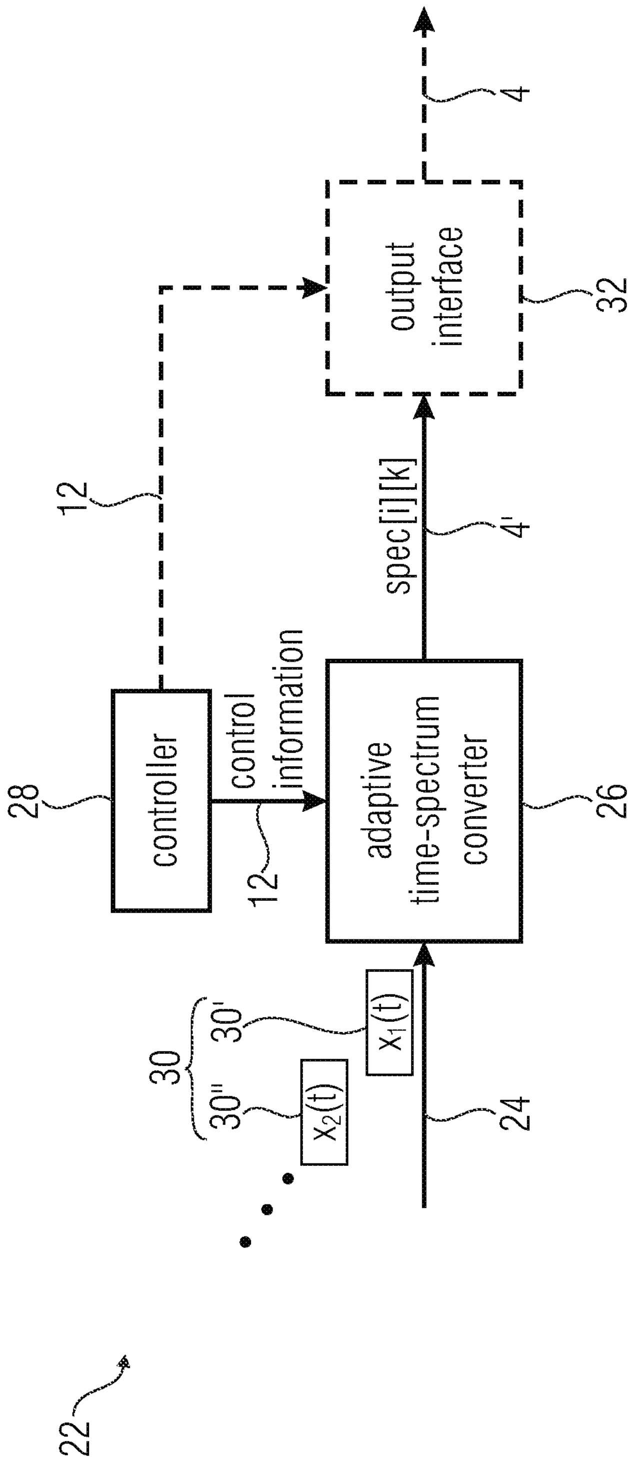
FIG. 3 shows a schematic block diagram of an encoder for encoding an audio signal according to an embodiment.

FIG. 3 shows a schematic block diagram of an encoder for encoding an audio signal according to an embodiment. The encoder comprises an adaptive time-spectrum converter 26 and a controller 28. The adaptive time-spectrum converter 26 converts overlapping blocks of time values 30, comprising for example blocks 30' and 30", into successive blocks of spectral values 4'. Furthermore, the adaptive time-spectrum converter 26 receives a control information 12*a* and switches, in response to the control information, between transform kernels of a first group of transform kernels comprising one or more transform kernels having different symmetries at sides of a kernel, and a second group of transform kernels comprising one or more transform kernels having the same symmetries at sides of a transform kernel. Moreover, a controller 28 is configured to control the time-spectrum converter to switch between transform kernels of a first group of transform kernels and transform kernels of a second group of transform kernels. Optionally, the encoder 22 may comprise an output interface 32 for generating an encoded audio signal for having, for a current frame, a control information 12 indicating a symmetry of the transform kernel used for generating the current frame. A current frame may be a current block of the successive blocks of spectral values. The output interface may include into a control data section of the current frame a symmetry information for the current frame and for the previous frame, where the current frame is an independent frame, or to include, in the control data section of the current frame, only symmetry information for the current frame and no symmetry information for the previous frame, when the current frame is a dependent frame. An independent frame comprises e.g. an independent frame header, which ensures that a current frame may be read without knowledge of the previous frame. Dependent frames occur e.g. in audio files having a variable bitrate switching. A dependent frame is therefore only readable with the knowledge of one or more previous frames.

The controller may be configured to analyze the audio signal 24, for example with respect to fundamental frequencies being at least close to an integer multiple of the frequency resolution of the transform. Therefore, the controller may derive the control information 12 feeding the adaptive time-spectrum converter 26 and optionally the output interface 32 with the control information 12. The control information 12 may indicate suitable transform kernels of the first group of transform kernels or the second group of transform kernels. The first group of transform kernels may have one or more transform kernels having an odd symmetry at a left side of the kernel and an even symmetry at the right side of the kernel or vice versa. The second group of transform kernels may comprise one or more transform kernels having an even symmetry at both sides or an odd symmetry at both sides of the kernel. In other words, the first group of transform kernels may comprise an MDCT-IV transform kernel or an MDST-IV transform kernel, or the second group of transform kernels may comprise an MDCT-II transform kernel or an MDST-II transform kernel. For decoding the encoded audio signals, the decoder may apply the respective inverse transform to the transform kernels of the encoder. Therefore, the first group of transform kernels of the decoder may comprise an inverse MDCT-IV transform kernel or an inverse MDST-IV transform kernel, or the second group of transform kernels may comprise an inverse MDCT-II transform kernel or an inverse MDST-II transform kernel.

In other words, the control information 12 may comprise a current bit indicating a current symmetry for a current frame. Furthermore, the adaptive spectrum-time converter 6 may be configured to not switch from the first group to the second group of transform kernels, when the current bit indicates the same symmetry as was used in a preceding frame, and wherein the adaptive spectrum-time converter is configured to switch from the first group to the second group of transform kernels, when the current bit indicates a different symmetry as was used in the preceding frame.

Furthermore the adaptive spectrum-time converter 6 may be configured to not switch from the second group to the first group of transform kernels, when the current bit indicates a different symmetry as was used in a preceding frame, and wherein the adaptive spectrum-time converter is configured to switch from the second group to the first group of transform kernels, when the current bit indicates the same symmetry as was used in the preceding frame.

Subsequently, reference is made to FIGS. 4*a* and 4*b* in order to illustrate the relation of time portions and blocks either on the encoder or analysis side or on the decoder or synthesis side.

Figure 4A:
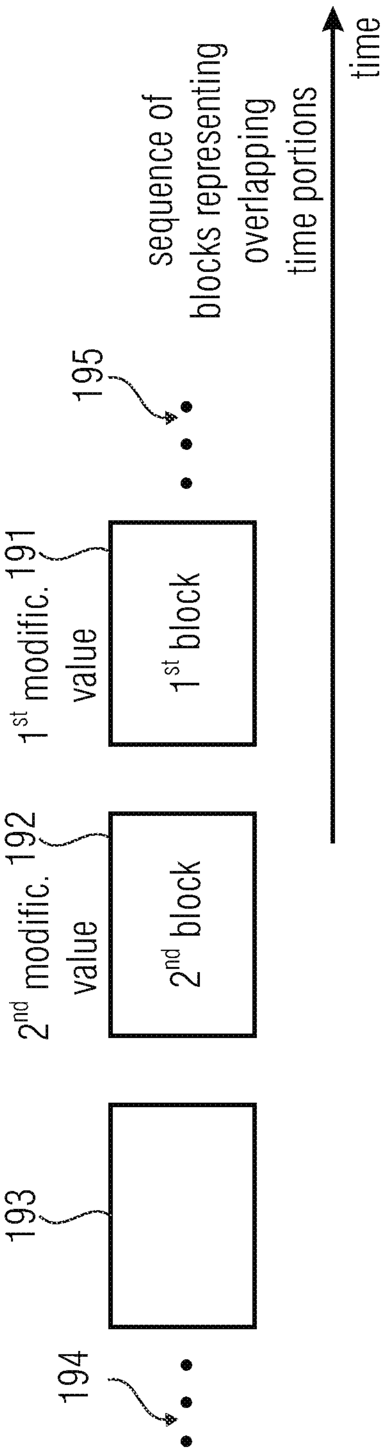
FIG. 4*a* shows a schematic sequence of blocks of spectral values obtained by an exemplary MDCT encoder.
Figure 4B:
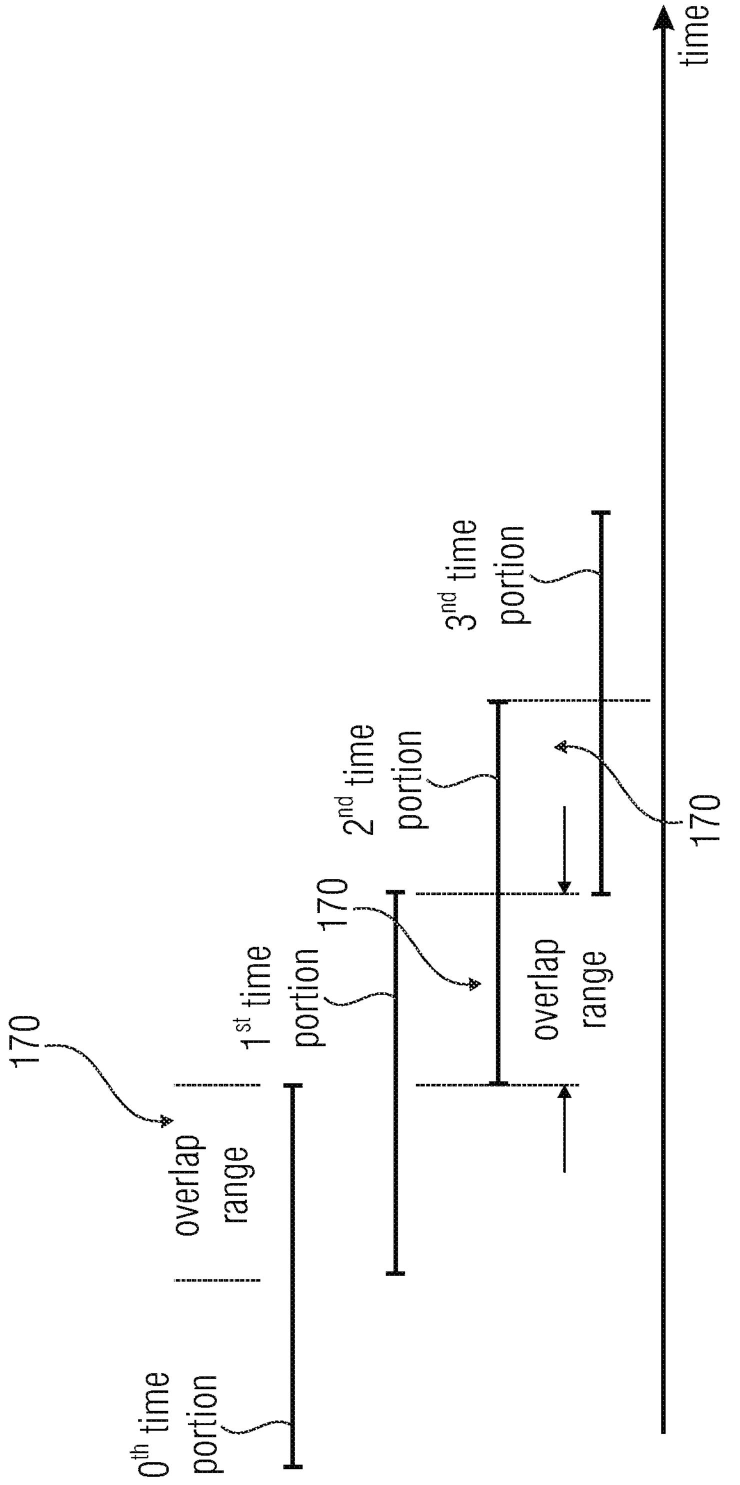
FIG. 4*b* shows a schematic representation of a time-domain signal being input to an exemplary MDCT encoder.
Figure 5A:
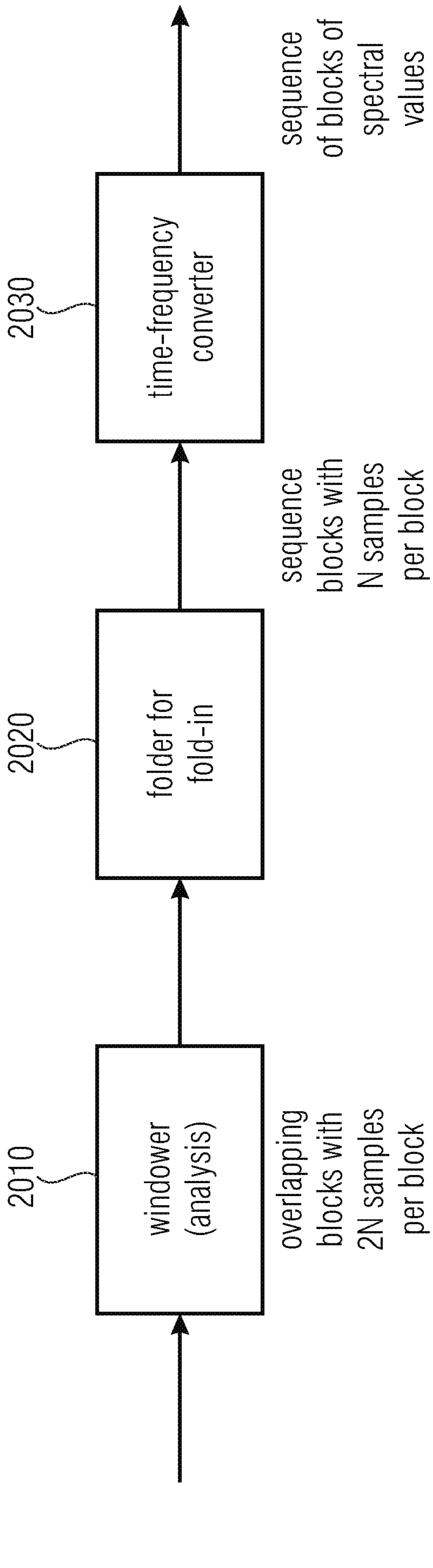
FIG. 5*a* shows a schematic block diagram of an exemplary MDCT encoder according to an embodiment.

FIG. 4*b* illustrates a schematic representation of a $0^{th}$ time portion to a third time portion and each time portion of these subsequent time portions has a certain overlapping range 170. Based on these time portions, the blocks of the sequence of blocks representing overlapping time portions are generated by the processing discussed in more detail with respect to FIG. 5*a* showing an analysis side of an aliasing-introducing transform operation.

In particular, the time domain signal illustrated in FIG. 4*b*, when FIG. 4*b* applies to the analysis side is windowed by a windower 201 applying an analysis window. Hence, in order to obtain the $0^{th}$ time portion, for example, the windower applies the analysis window to, for example, 2048 samples, and specifically to sample 1 to sample 2048. Therefore, N is equal to 1024 and a window has a length of 2N samples, which in the example is 2048. Then, the windower applies a further analysis operation, but not for the sample 2049 as the first sample of the block, but for the sample 1025 as the first sample in the block in order to obtain the first time portion. Hence, the first overlap range 170, which is 1024 samples long for a 50% overlap, is obtained. This procedure is additionally applied for the second and the third time portions, but with an overlapping in order to obtain a certain overlap range 170.

It is to be emphasized that the overlap does not necessarily have to be a 50% overlap, but the overlap can be higher and lower and there can even be a multi-overlap, i.e. an overlap of more than two windows so that a sample of the time domain audio signal does not contribute to two windows and consequently blocks of spectral values only, but a sample then contributes to even more than two windows/blocks of spectral values. On the other hand, those skilled in the art additionally understand that other window shapes exist which can be applied by the windower 201 of FIG. 5*a*, which have 0 portions and/or portions having unity values. For such portions having unity values, it appears that such portions typically overlap with 0 portions of preceding or subsequent windows and therefore a certain audio sample located in a constant portion of a window having unity values contributes to a single block of spectral values only.

The windowed time portions as obtained by FIG. 4*b* are then forwarded to a folder 202 for performing a fold-in operation. This fold-in operation can for example perform a fold-in so that at the output of the folder 202, only blocks of sampling values having N samples per block exist. Then, subsequent to the folding operation performed by the folder 202, a time-frequency converter is applied which is, for example, a DCT-IV converter converting N samples per block at the input into N spectral values at the output of the time-frequency converter 203.

Thus, the sequence of blocks of spectral values obtained at the output of block 203 is illustrated in FIG. 4*a*, specifically showing the first block 191 having associated a first modification value illustrated at 102 in FIGS. 1*a* and 1*b* and having a second block 192 having associated the second modification value such as 106 illustrated in FIGS. 1*a* and 1*b*. Naturally, the sequence has more blocks 193 or 194, preceding the second block or even leading the first block as illustrated. The first and second blocks 191, 192 are, for example, obtained by transforming the windowed first time portion of FIG. 4*b* to obtain the first block and the second block is obtained by transforming the windowed second time portion of FIG. 4*b* by the time-frequency converter 203 of FIG. 5*a*. Hence, both blocks of spectral values being adjacent in time in the sequence of blocks of spectral values represent an overlapping range covering the first time portion and the second time portion.

Figure 5B:
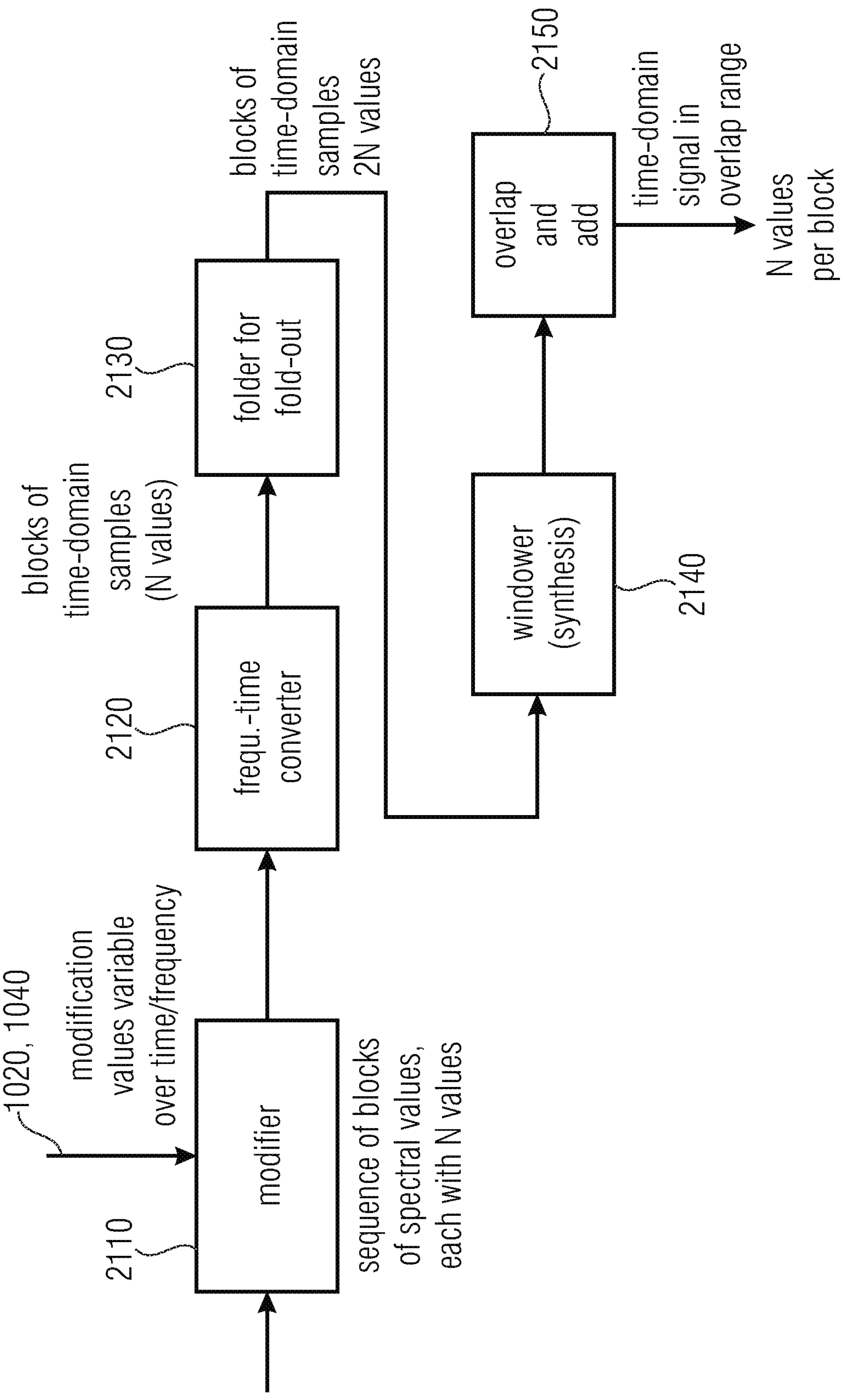
FIG. 5*b* shows a schematic block diagram of an exemplary MDCT decoder according to an embodiment.

Subsequently, FIG. 5*b* is discussed in order to illustrate a synthesis-side or decoder-side processing of the result of the encoder or analysis-side processing of FIG. 5*a*. The sequence of blocks of spectral values output by the frequency converter 203 of FIG. 5*a* is input into a modifier 211. As outlined, each block of spectral values has N spectral values for the example illustrated in FIGS. 4*a* to 5*b* (note that this is different from equations (1) and (2), where M is used). Each block has associated its modification values such as 102, 104 illustrated in FIGS. 1*a* and 1*b*. Then, in a typical IMDCT operation or redundancy-reducing synthesis transform, operations illustrated by a frequency-time converter 212, a folder 213 for folding out, a windower 214 for applying a synthesis window and an overlap/adder operation illustrated by block 215 are performed in order to obtain the time domain signal in the overlap range. The same has, in the example, 2N values per block, so that after each overlap and add operation, N new aliasing-free time domain samples are obtained provided that the modification values 102, 104 are not variable over time or frequency. However, if those values are variable over time and frequency, then the output signal of block 215 is not aliasing-free, but this problem is addressed by the first and the second aspect of the present invention as discussed in the context of FIGS. 1*b* and 1*a* and as discussed in the context of the other figures in the specification.

Subsequently, a further illustration of the procedures performed by the blocks in FIG. 5*a* and FIG. 5*b* is given.

The illustration is exemplified by reference to the MDCT, but other aliasing-introducing transforms can be processed in a similar and analogous manner. As a lapped transform, the MDCT is a bit unusual compared to other Fourier-related transforms in that it has half as many outputs as inputs (instead of the same number). In particular, it is a linear function $F:R^{2N}\rightarrow R^{N}$ (where R denotes the set of real numbers). The 2N real numbers x0, . . . , x2N−1 are transformed into the N real numbers X0, . . . , XN−1 according to the formula:

$$X_k = \sum_{n=0}^{2N-1} x_n \cos\left[\frac{\pi}{N}\left(n+\frac{1}{2}+\frac{N}{2}\right)\left(k+\frac{1}{2}\right)\right]$$

(The normalization coefficient in front of this transform, here unity, is an arbitrary convention and differs between treatments. Only the product of the normalizations of the MDCT and the IMDCT, below, is constrained.)

The inverse MDCT is known as the IMDCT. Because there are different numbers of inputs and outputs, at first glance it might seem that the MDCT should not be invertible. However, perfect invertibility is achieved by adding the overlapped IMDCTs of time-adjacent overlapping blocks, causing the errors to cancel and the original data to be retrieved; this technique is known as time-domain aliasing cancellation (TDAC).

The IMDCT transforms N real numbers X0, . . . , XN−1 into 2N real numbers y0, . . . , y2N−1 according to the formula:

$$y_n = \frac{1}{N}\sum_{n=0}^{N-1} X_k \cos\left[\frac{\pi}{N}\left(n + \frac{1}{2} + \frac{N}{2}\right)\left(k + \frac{1}{2}\right)\right]$$

(Like for the DCT-IV, an orthogonal transform, the inverse has the same form as the forward transform.)

In the case of a windowed MDCT with the usual window normalization (see below), the normalization coefficient in front of the IMDCT should be multiplied by 2 (i.e., becoming 2/N).

In typical signal-compression applications, the transform properties are further improved by using a window function wn (n=0, . . . , 2N−1) that is multiplied with xn and yn in the MDCT and IMDCT formulas, above, in order to avoid discontinuities at the n=0 and 2N boundaries by making the function go smoothly to zero at those points. (That is, one windows the data before the MDCT and after the IMDCT.) In principle, x and y could have different window functions, and the window function could also change from one block to the next (especially for the case where data blocks of different sizes are combined), but for simplicity one considers the common case of identical window functions for equal-sized blocks.

The transform remains invertible (that is, TDAC works), for a symmetric window wn=w2N−1-n, as long as w satisfies the Princen-Bradley condition:

$$w_n^2 + w_{n+N}^2 = 1$$

various window functions are used. A window that produces a form known as a modulated lapped transform is given by $$w_n = \sin\left[\frac{\pi}{2N}\left(n + \frac{1}{2}\right)\right]$$

and is used for MP3 and MPEG-2 AAC, and $$w_n = \sin\left(\frac{\pi}{2}\sin^2\left[\frac{\pi}{2N}\left(n + \frac{1}{2}\right)\right]\right)$$

for Vorbis. AC-3 uses a Kaiser-Bessel derived (KBD) window, and MPEG-4 AAC can also use a KBD window.

Note that windows applied to the MDCT are different from windows used for some other types of signal analysis, since they have to fulfill the Princen-Bradley condition. One of the reasons for this difference is that MDCT windows are applied twice, for both the MDCT (analysis) and the IMDCT (synthesis).

As can be seen by inspection of the definitions, for even N the MDCT is essentially equivalent to a DCT-IV, where the input is shifted by N/2 and two N-blocks of data are transformed at once. By examining this equivalence more carefully, important properties like TDAC can be easily derived.

In order to define the precise relationship to the DCT-IV, it has to be realized that the DCT-IV corresponds to alternating even/odd boundary conditions (i.e. symmetry conditions): even at its left boundary (around n=−½), odd at its right boundary (around n=N−½), and so on (instead of periodic boundaries as for a DFT). This follows from the identities $$\cos\left[\frac{\pi}{N}\left(-n - 1 + \frac{1}{2}\right)\left(k + \frac{1}{2}\right)\right] = \cos\left[\frac{\pi}{N}\left(n + \frac{1}{2}\right)\left(k + \frac{1}{2}\right)\right] \text{ and}$$

$$\cos\left[\frac{\pi}{N}\left(2N - n - 1 + \frac{1}{2}\right)\left(k + \frac{1}{2}\right)\right] = -\cos\left[\frac{\pi}{N}\left(n + \frac{1}{2}\right)\left(k + \frac{1}{2}\right)\right].$$

Thus, if its inputs are an array x of length N, one can imagine extending this array to (x, −xR, −x, xR, . . . ) and so on, where xR denotes x in reverse order.

Consider an MDCT with 2N inputs and N outputs, where one divides the inputs into four blocks (a, b, c, d) each of size N/2. If one shifts these to the right by N/2 (from the +N/2 term in the MDCT definition), then (b, c, d) extend past the end of the N DCT-IV inputs, so they have to be "folded" back according to the boundary conditions described above.

Thus, the MDCT of 2N inputs (a, b, c, d) is exactly equivalent to a DCT-IV of the N inputs: (−cR−d, a−bR), where R denotes reversal as above.

This is exemplified for window function 202 in FIG. 5*a*. a is the portion 204*b, b* is the portion 205*a, c* is the portion 205*b* and *d* is the portion 206*a*.

(In this way, any algorithm to compute the DCT-IV can be trivially applied to the MDCT.)

Similarly, the IMDCT formula above is precisely ½ of the DCT-IV (which is its own inverse), where the output is extended (via the boundary conditions) to a length 2N and shifted back to the left by N/2. The inverse DCT-IV would simply give back the inputs (−cR−d, a−bR) from above. When this is extended via the boundary conditions and shifted, one obtains:

$$\text{IMDCT}(\text{MDCT}(a,b,c,d)) = (a-bR, b-aR, c+dR, d+cR)/2.$$

Half of the IMDCT outputs are thus redundant, as b−aR=−(a−bR)R, and likewise for the last two terms. If one groups the input into bigger blocks A,B of size N, where A=(a, b) and B=(c, d), one can write this result in a simpler way:

$$\text{IMDCT}(\text{MDCT}(A,B)) = (A-AR, B+BR)/2$$

One can now understand how TDAC works. Suppose that one computes the MDCT of the time-adjacent, 50% overlapped, 2N block (B, C). The IMDCT will then yield, analogous to the above: (B−BR, C+CR)/2. When this is added with the previous IMDCT result in the overlapping half, the reversed terms cancel and one obtains simply B, recovering the original data.

The origin of the term "time-domain aliasing cancellation" is now clear. The use of input data that extend beyond the boundaries of the logical DCT-IV causes the data to be aliased in the same way (with respect to extension symmetry) that frequencies beyond the Nyquist frequency are aliased to lower frequencies, except that this aliasing occurs in the time domain instead of the frequency domain: one cannot distinguish the contributions of a and of bR to the MDCT of (a, b, c, d), or equivalently, to the result of IMDCT(MDCT(a, b, c, d))=(a−bR, b−aR, c+dR, d+cR)/2. The combinations c-dR and so on, have precisely the right signs for the combinations to cancel when they are added.

For odd N (which are rarely used in practice), N/2 is not an integer so the MDCT is not simply a shift permutation of a DCT-IV. In this case, the additional shift by half a sample means that the MDCT/IMDCT becomes equivalent to the DCT-III/II, and the analysis is analogous to the above.

We have seen above that the MDCT of 2N inputs (a, b, c, d) is equivalent to a DCT-IV of the N inputs (−cR−d, a−bR). The DCT-IV is designed for the case where the function at the right boundary is odd, and therefore the values near the right boundary are close to 0. If the input signal is smooth, this is the case: the rightmost components of a and bR are consecutive in the input sequence (a, b, c, d), and therefore their difference is small. Let us look at the middle of the interval: if one rewrites the above expression as (−cR−d, a−bR)=(−d, a)−(b,c)R, the second term, (b,c)R, gives a smooth transition in the middle. However, in the first term, (−d, a), there is a potential discontinuity where the right end of −d meets the left end of a. This is the reason for using a window function that reduces the components near the boundaries of the input sequence (a, b, c, d) towards 0.

Above, the TDAC property was proved for the ordinary MDCT, showing that adding IMDCTs of time-adjacent blocks in their overlapping half recovers the original data. The derivation of this inverse property for the windowed MDCT is only slightly more complicated.

Consider two overlapping consecutive sets of 2N inputs (A,B) and (B,C), for blocks A,B,C of size N. Recall from above that when (A,B) and (B,C) are input into an MDCT, an IMDCT, and added in their overlapping half, one obtains $(B+B_R)/2+(B-B_R)/2=B$, the original data.

Now one supposes that one multiplies both the MDCT inputs and the IMDCT outputs by a window function of length 2N. As above, one assumes a symmetric window function, which is therefore of the form $(W,W_R)$ where W is a length-N vector and R denotes reversal as before. Then the Princen-Bradley condition can be written as $W^2+W_R^2=(1, 1, \ldots)$, with the squares and additions performed element-wise.

Therefore, instead of performing an MDCT (A,B), one now MDCTs $(WA,W_RB)$ with all multiplications performed element-wise. When this is input into an IMDCT and multiplied again (element-wise) by the window function, the last-N half becomes:

$$W_R\cdot(W_RB+(W_RB)_R)=W_R\cdot(W_RB+WB_R)=W_R^2B+WW_RB_R$$

(Note that one no longer has the multiplication by ½, because the IMDCT normalization differs by a factor of 2 in the windowed case.)

Similarly, the windowed MDCT and IMDCT of (B,C) yields, in its first-N half:

$$W\cdot(WB-W_RB_R)=W^2B-WW_RB_R$$

When one adds these two halves together, one recovers the original data. The reconstruction is also possible in the context of window switching, when the two overlapping window halves fulfill the Princen-Bradley condition. Aliasing cancellation could in this case be done exactly the same way as described above. For transforms with multiple overlap, more than two branches would be needed using all involved gain values.

Previously has been described the symmetries or boundary conditions of the MDCT, or more specifically, the MDCT-IV. The description is also valid for the other transform kernels referred to in this document, namely the MDCT-II, the MDST-II, and the MDST-IV. However, it has to be noted that the different symmetry or boundary conditions of the other transform kernels have to be taken into account.

Figure 6:
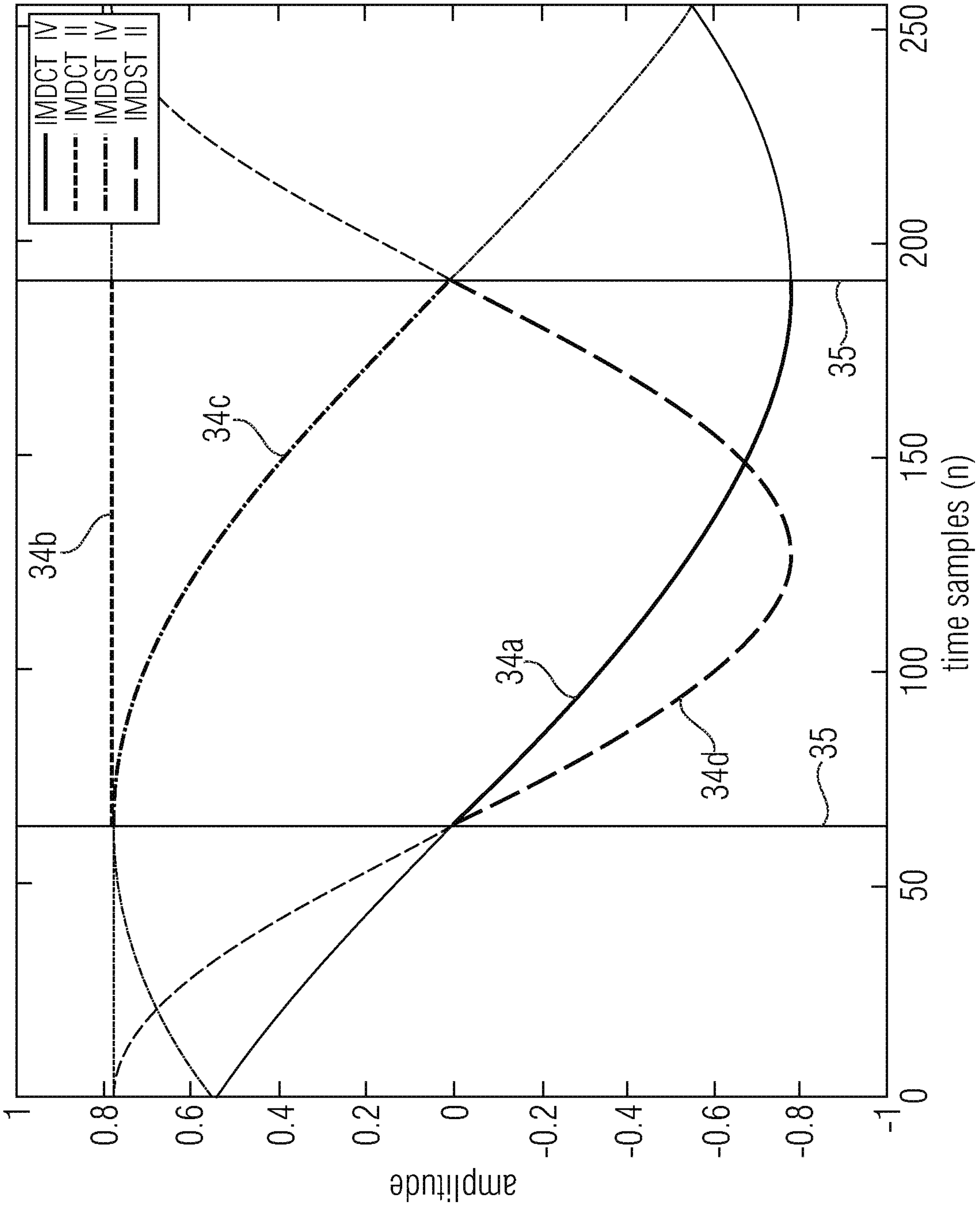
FIG. 6 schematically illustrates the implicit fold-out property and symmetries of the four described lapped transforms.

FIG. 6 schematically illustrates the implicit fold-out property and symmetries (i.e. boundary conditions) of the four described lapped transforms. The transforms are derived from (2) by way of the first synthesis base function for each of the four transforms. The IMDCT-IV 34*a*, the IMDCT-II 34*b*, the IMDST-IV 34*c*, and the IMDST-II 34*d* are depicted in a schematic diagram of the amplitude over time samples. FIG. 6 clearly indicates the even and odd symmetries of the transform kernels at the symmetry axis 35 (i.e. folding points), in between the transform kernel as described above.

The time domain aliasing cancellation (TDAC) property states that such aliasing is cancelled when even and odd symmetric extensions are summed up during OLA (overlap-and-add) processing. In other words, a transform with an odd right-side symmetry should be followed by a transform with an even left-side symmetry, and vice versa, in order for TDAC to occur. Thus, we can state that The (inverse) MDCT-IV shall be followed by an (inverse) MDCT-IV or (inverse) MDST-II.

The (inverse) MDST-IV shall be followed by an (inverse) MDST-IV or (inverse) MDCT-II.

The (inverse) MDCT-II shall be followed by an (inverse) MDCT-IV or (inverse) MDST-II.

The (inverse) MDST-II shall be followed by an (inverse) MDST-IV or (inverse) MDCT-II.

Figure 7:
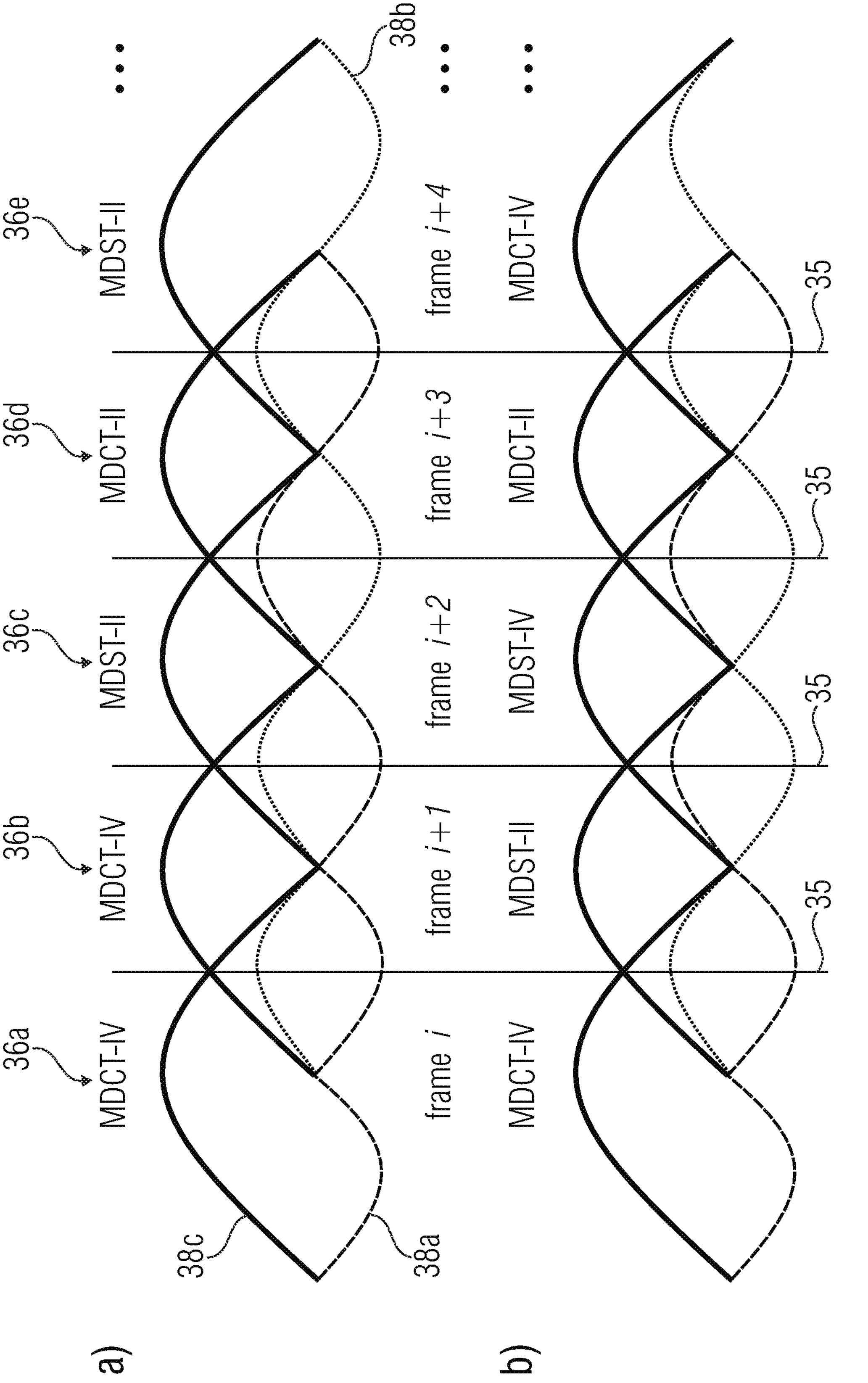
FIG. 7 schematically shows two embodiments of a use case where the signal-adaptive transform kernel switching is applied to the transform kernel from one frame to the next frame while allowing a perfect reconstruction.

FIGS. 7*a*, 7*b* schematically depict two embodiments of a use case where the signal-adaptive transform kernel switching is applied to the transform kernel from one frame to the next frame while allowing a perfect reconstruction. In other words, two possible sequences of the above mentioned transform sequences are exemplified in FIG. 7. Therein, solid lines (such as line 38*c*) indicate the transform window, dashed lines 38*a* indicate the left side aliasing symmetry of the transform window and dotted lines 38*b* indicate the right side aliasing symmetry of the transform window. Furthermore, symmetry peaks indicate even symmetry and symmetry valleys indicate odd symmetry. In FIG. 7*a*, frame i 36*a* and frame i+1 36*b* is an MDCT-IV transform kernel, wherein in frame i+2 36*c* an MDST-II is used as a transition to the MDCT-II transform kernel used in frame i+3 36*d*. Frame i+4 36*e* again uses an MDST-II, for example leading to an MDST-IV or again to an MDCT-II in frame i+5, which is not shown in FIG. 7*a*. However, FIG. 7*a* clearly indicates that dashed lines 38*a* and dotted lines 38*b* compensate for subsequent transform kernels. In other words, summing up the left side aliasing symmetry of a current frame and the right side aliasing symmetry of a previous frame leads to a perfect time domain aliasing cancellation (TDAC), since the sum of the dashed and dotted lines is equal to 0. The left and right side aliasing symmetries (or boundary conditions) relate to the folding property described for example in FIG. 5*a* and FIG. 5*b* and is a result of the MDCT generating an output comprising N samples from an input comprising 2N samples.

FIG. 7*b* is similar to FIG. 7*a*, only using a different sequence of transform kernels for frame i to frame i+4. For frame i 36*a*, an MDCT-IV is used, wherein frame i+1 36*b* uses an MDST-II as a transition to the MDST-IV used in frame i+2 36*c*. Frame i+3 uses an MDCT-II transform kernel as a transition from the MDST-IV transform kernel used in frame i+2 36*d* to the MDCT-IV transform kernel in frame i+4 36*e*.

The related decision matrix to the transform sequences is illustrated in table 1.

Embodiments further show how the proposed adaptive transform kernel switching can be employed advantageously in an audio codec like HE-AAC to minimize or even avoid the two issues mentioned in the beginning. Following will be addressed highly harmonic signals suboptimally coded by the classical MDCT. An adaptive transition to the MDCT-II or MDST-II may be performed by an encoder based on e.g. the fundamental frequency of the input signal. More specifically, when the pitch of the input signal is exactly, or very close to, an integer multiple of the frequency resolution of the transform (i.e. the bandwidth of one transform bin in the spectral domain), the MDCT-II or MDST-II may be employed for the affected frames and channels. A direct transition from the MDCT-IV to the MDCT-II transform kernel, however, is not possible or at least does not guarantee time domain aliasing cancellation (TDAC). Therefore, a MDCT-II shall be utilized as a transition transform between the two in such a case. Conversely, for a transition from the MDST-II to the traditional MDCT-IV (i.e. switching back to traditional MDCT coding), an intermediate MDCT-II is advantageous.

So far, the proposed adaptive transform kernel switching was described for a single audio signal, since it enhances the encoding of highly harmonic audio signals. Furthermore, it may be easily adapted for multichannel signals, such as for example stereo signals. Here, the adaptive transform kernel switching is also advantageous, if for example the two or more channels of a multichannel signal have a phase shift of roughly ±90° to each other.

For multichannel audio processing, it may be appropriate to use MDCT-IV coding for one audio channel and MDST-IV coding for a second audio channel. Especially if both audio channels comprise a phase shift of roughly ±90 degrees before coding, this concept is advantageous. Since the MDCT-IV and the MDST-IV apply a phase shift of 90 degrees to an encoded signal when compared to each other, a phase shift of ±90 degrees between two channels of an audio signal is compensated after encoding, i.e. is converted into a 0- or 180-degree phase shift by way of the 90-degree phase difference between the cosine base-functions of the MDCT-IV and the sine base-functions of the MDST-IV. Therefore, using e.g. M/S stereo coding, both channels of the audio signal may be encoded in the mid signal, wherein only minimum residual information needs to be encoded in the side signal, in case of the abovementioned conversion into a 0-degree phase shift, or vice versa (minimum information in the mid signal) in case of the conversion into a 180-degree phase shift, thereby achieving maximum channel compaction. This may achieve a bandwidth reduction by up to 50% compared to a classical MDCT-IV coding of both audio channels while still using lossless coding schemes. Furthermore, it may be thought of using MDCT stereo coding in combination with a complex stereo prediction. Both approaches calculate, encode and transmit a residual signal from two channels of the audio signal. Moreover, complex prediction calculates prediction parameters to encode the audio signal, wherein the decoder uses the transmitted parameters to decode the audio signal. However, M/S coding using e.g. the MDCT-IV and the MDST-IV for encoding the two audio channels, as already described above, only the information regarding the used coding scheme (MDCT-II, MDST-II, MDCT-IV, or MDST-IV) should be transmitted to enable the decoder to apply the related encoding scheme. Since the complex stereo prediction parameters should be quantized using a comparably high resolution, the information regarding the used coding scheme may be encoded in e.g. 4 bits, since theoretically, the first and the second channel may each be encoded using one of the four different coding schemes, which leads to 16 different possible states.

Figure 8:
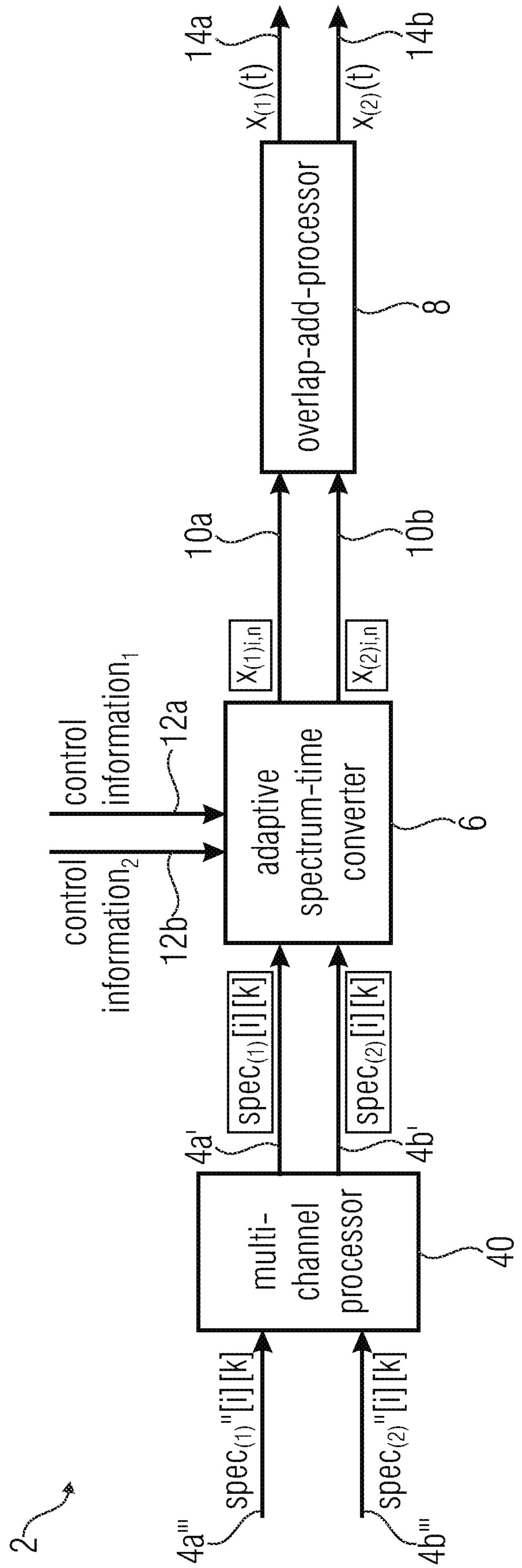
FIG. 8 shows a schematic block diagram of a decoder for decoding a multichannel audio signal according to an embodiment.

Therefore, FIG. 8 shows a schematic block diagram of a decoder 2 for decoding a multichannel audio signal. Compared to the decoder of FIG. 1, the decoder further comprises a multichannel processor 40 for receiving blocks of spectral values 4*a*''', 4*b*''' representing a first and a second multichannel, and for processing, in accordance with a joint multichannel processing technique, the received blocks to obtain processed blocks of spectral values 4*a*', 4*b*' for the first multichannel and the second multichannel, and wherein the adaptive spectrum-time processor is configured to process the processed blocks 4*a*' of the first multichannel using control information 12*a* for the first multichannel and the processed blocks 4*b*' for the second multichannel using control information 12*b* for the second multichannel. The multichannel processor 40 may apply, for example, a left/right stereo processing, or a mid/side stereo processing, or the multichannel processor applies a complex prediction using a complex prediction control information associated with blocks of spectral values representing the first and the second multichannel. Therefore, the multichannel processor may comprise a fixed preset or get an information e.g. from the control information, indicating which processing was used to encode the audio signal. Besides a separate bit or word in the control information, the multichannel processor may get this information from the present control information e.g. by an absence or a presence of multichannel processing parameters. In other words, the multichannel processor 40 may apply the inverse operation to a multichannel processing performed in the encoder to recover separate channels of the multichannel signal. Further multichannel processing techniques are described with respect to FIGS. 10 to 14. Furthermore, reference signs were adapted to the multichannel processing, where the reference signs extended by the letter "a" indicate a first multichannel and reference signs extended by the letter "b" indicate a second multichannel. Moreover, multichannel is not limited to two channels, or stereo processing, but may be applied to three or more channels by extending the depicted processing of two channels.

According to embodiments, the multichannel processor of the decoder may process, in accordance with the joint multichannel processing technique, the received blocks. Furthermore, the received blocks may comprise an encoded residual signal of a representation of the first multichannel and a representation of the second multichannel. Moreover, the multichannel processor may be configured to calculate the first multichannel signal and the second multichannel signal using the residual signal and a further encoded signal. In other words, the residual signal may be the side signal of a M/S encoded audio signal or a residual between a channel of the audio signal and a prediction of the channel based on a further channel of the audio signal when using, e.g. complex stereo prediction. The multichannel processor may therefore convert the M/S or complex predicted audio signal into an L/R audio signal for further processing such as e.g. applying the inverse transform kernels. Therefore, the multichannel processor may use the residual signal and the further encoded audio signal which may be the mid signal of a M/S encoded audio signal or a (e.g. MDCT encoded) channel of the audio signal when using complex prediction.

Figure 9:
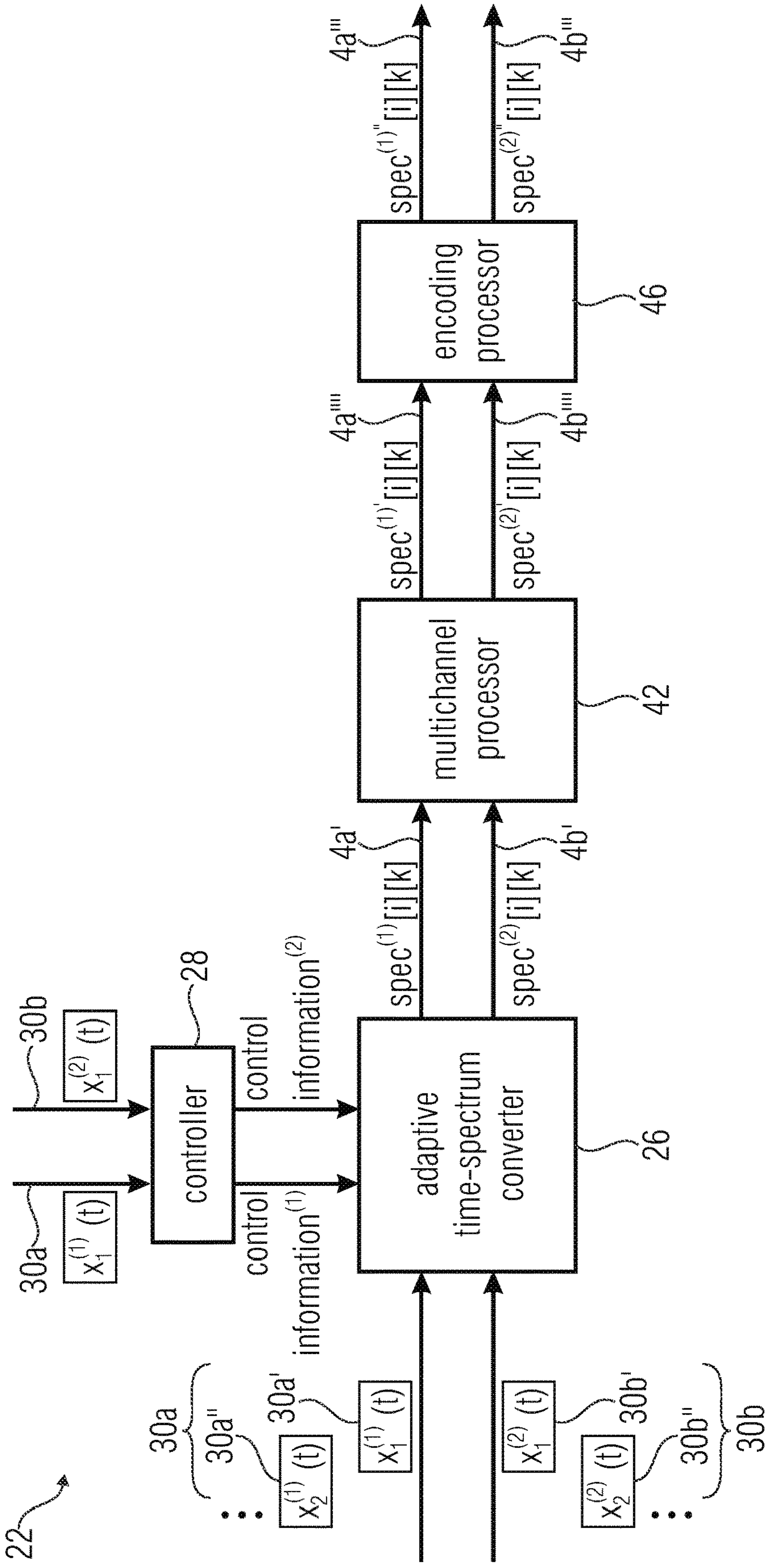
FIG. 9 shows a schematic block diagram of the encoder of FIG. 3 being extended to multichannel processing according to an embodiment.

FIG. 9 shows the encoder 22 of FIG. 3 extended to multichannel processing. Even though the figures anticipate that the control information 12 is included in the encoded audio signal 4, the control information 12 may further be transmitted using e.g. a separate control information channel. The controller 28 of the multichannel encoder may analyze the overlapping blocks of time values 30*a*, 30*b* of the audio signal, having a first channel and a second channel, to determine the transform kernel for a frame of the first channel and a corresponding frame of the second channel. Therefore, the controller may try each combination of transform kernels to derive that option of transform kernels that minimizes the residual signal (or side signal in terms of M/S coding) of e.g. M/S coding or complex prediction. A minimized residual signal is e.g. that residual signal with the lowest energy compared to the remaining residual signals. This is e.g. advantageous, if a further quantization of the residual signal uses less bits to quantize a small signal when compared to quantizing a greater signal. Moreover, the controller 28 may determine a first control information 12*a* for a first channel and a second control information 12*b* for a second channel being input into the adaptive time-spectrum converter 26 which applies one of the previously described transform kernels. Therefore, the time-spectrum converter 26 may be configured to process a first channel and a second channel of a multichannel signal. Moreover, the multichannel encoder may further comprise a multichannel processor 42 for processing the successive blocks of spectral values 4*a*', 4*b*' of the first channel and the second channel using a joint multichannel processing technique such as, for example, left/right stereo coding, mid/side stereo coding, or complex prediction, to obtain processed blocks of spectral values 40*a*'''', 40*b*''''. The encoder may further comprise an encoding processor 46 for processing the processed blocks of spectral values to obtain encoded channels 40*a*''', 40*b*'''. The encoding processor may encode the audio signal using for example a lossy audio compression or a lossless audio compression scheme, such as for example scalar quantization of spectral lines, entropy coding, Huffman coding, channel coding, block codes or convolutional codes, or to apply forward error correction or automatic repeat request. Furthermore, lossy audio compression may refer to using a quantization based on a psycho acoustic model.

According to further embodiments, the first processed blocks of spectral values represent a first encoded representation of the joint multichannel processing technique and the second processed blocks of spectral values represent a second encoded representation of the joint multichannel processing technique. Therefore, the encoding processor 46 may be configured to process the first processed blocks using quantization and entropy encoding to form a first encoded representation and to process the second processed blocks using quantization and entropy encoding to form a second encoded representation. The first encoded representation and the second encoded representation may be formed in a bitstream representing the encoded audio signal. In other words, the first processed blocks may comprise the mid signal of a M/S encoded audio signal or a (e.g. MDCT) encoded channel of an encoded audio signal using complex stereo prediction. Moreover, the second processed blocks may comprise parameters or a residual signal for complex prediction or the side signal of a M/S encoded audio signal.

Figure 10:
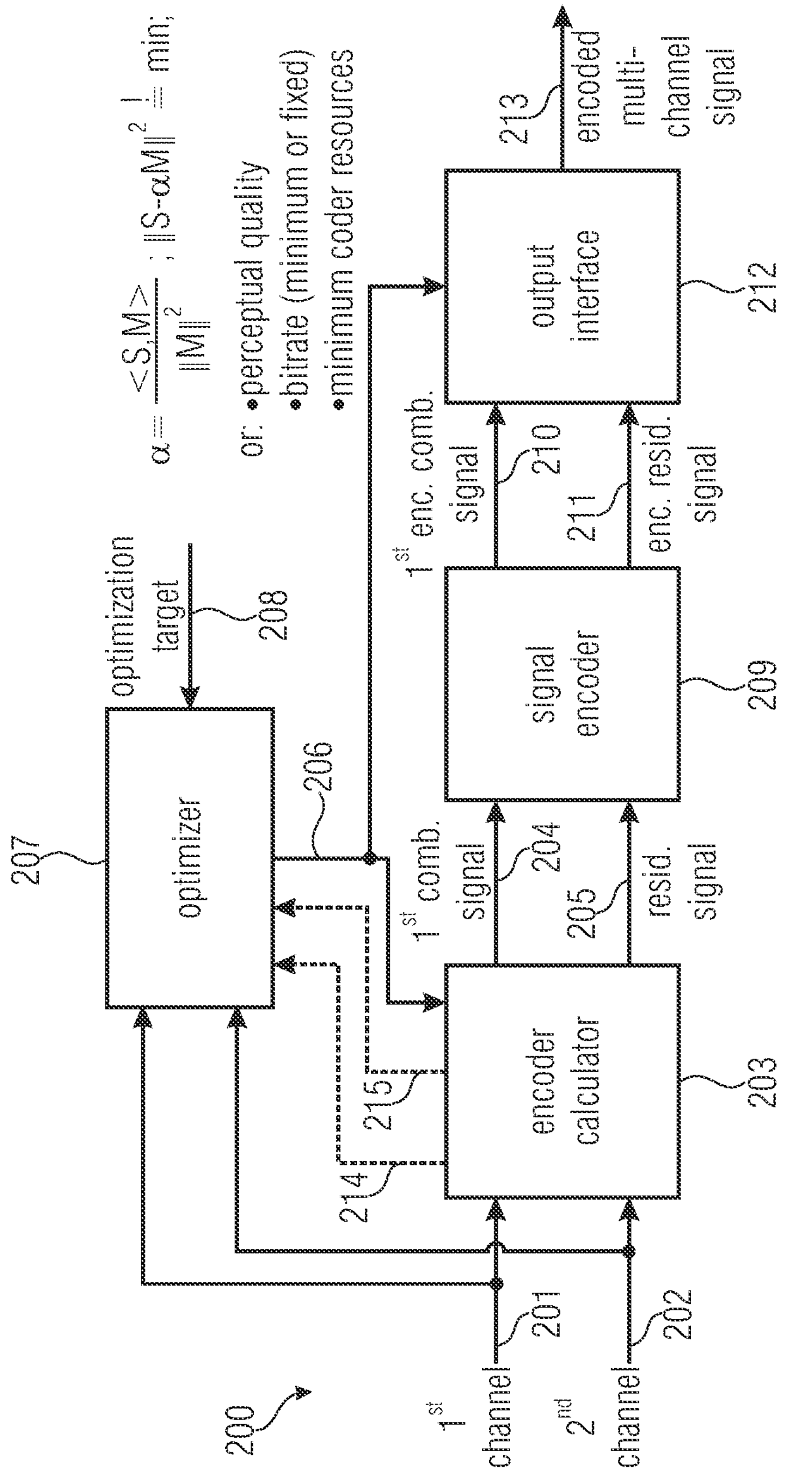
FIG. 10 illustrates a schematic audio encoder for encoding a multichannel audio signal having two or more channel signals according to an embodiment.

FIG. 10 illustrates an audio encoder for encoding a multichannel audio signal 200 having two or more channel signals, where a first channel signal is illustrated at 201 and a second channel is illustrated at 202. Both signals are input into an encoder calculator 203 for calculating a first combination signal 204 and a prediction residual signal 205 using the first channel signal 201 and the second channel signal 202 and the prediction information 206, so that the prediction residual signal 205, when combined with a prediction signal derived from the first combination signal 204 and the prediction information 206 results in a second combination signal, where the first combination signal and the second combination signal are derivable from the first channel signal 201 and the second channel signal 202 using a combination rule.

The prediction information is generated by an optimizer 207 for calculating the prediction information 206 so that the prediction residual signal fulfills an optimization target 208. The first combination signal 204 and the residual signal 205 are input into a signal encoder 209 for encoding the first combination signal 204 to obtain an encoded first combination signal 210 and for encoding the residual signal 205 to obtain an encoded residual signal 211. Both encoded signals 210, 211 are input into an output interface 212 for combining the encoded first combination signal 210 with the encoded prediction residual signal 211 and the prediction information 206 to obtain an encoded multichannel signal 213.

Depending on the implementation, the optimizer 207 receives either the first channel signal 201 and the second channel signal 202, or as illustrated by lines 214 and 215, the first combination signal 214 and the second combination signal 215 derived from a combiner 2031 of FIG. 11*a*, which will be discussed later.

An optimization target is illustrated in FIG. 10, in which the coding gain is maximized, i.e. the bit rate is reduced as much as possible. In this optimization target, the residual signal D is minimized with respect to $\alpha$. This means, in other words, that the prediction information $\alpha$ is chosen so that $\|S-\alpha M\|^2$ is minimized. This results in a solution for $\alpha$ illustrated in FIG. 10. The signals S, M are given in a block-wise manner and are spectral domain signals, where the notation $\| \ldots \|$ means the 2-norm of the argument, and where $< \ldots >$ illustrates the dot product as usual. When the first channel signal 201 and the second channel signal 202 are input into the optimizer 207, then the optimizer would have to apply the combination rule, where an exemplary combination rule is illustrated in FIG. 11*c*. When, however, the first combination signal 214 and the second combination signal 215 are input into the optimizer 207, then the optimizer 207 does not need to implement the combination rule by itself.

Other optimization targets may relate to the perceptual quality. An optimization target can be that a maximum perceptual quality is obtained. Then, the optimizer would necessitate additional information from a perceptual model. Other implementations of the optimization target may relate to obtaining a minimum or a fixed bit rate. Then, the optimizer 207 would be implemented to perform a quantization/entropy-encoding operation in order to determine the necessitated bit rate for certain a values so that the a can be set to fulfill the requirements such as a minimum bit rate, or alternatively, a fixed bit rate. Other implementations of the optimization target can relate to a minimum usage of encoder or decoder resources. In case of an implementation of such an optimization target, information on the necessitated resources for a certain optimization would be available in the optimizer 207. Additionally, a combination of these optimization targets or other optimization targets can be applied for controlling the optimizer 207 which calculates the prediction information 206.

Figure 11A:
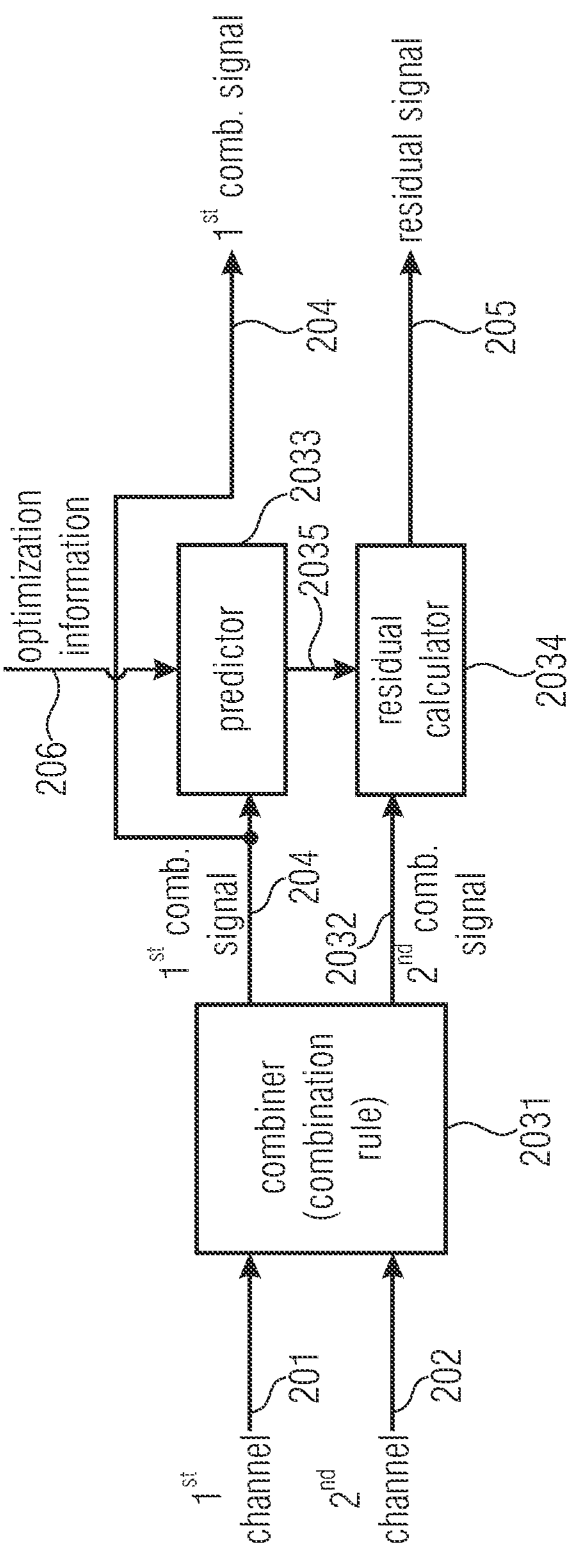
FIG. 11*a* shows a schematic block diagram of an encoder calculator according to an embodiment.
Figure 11B:
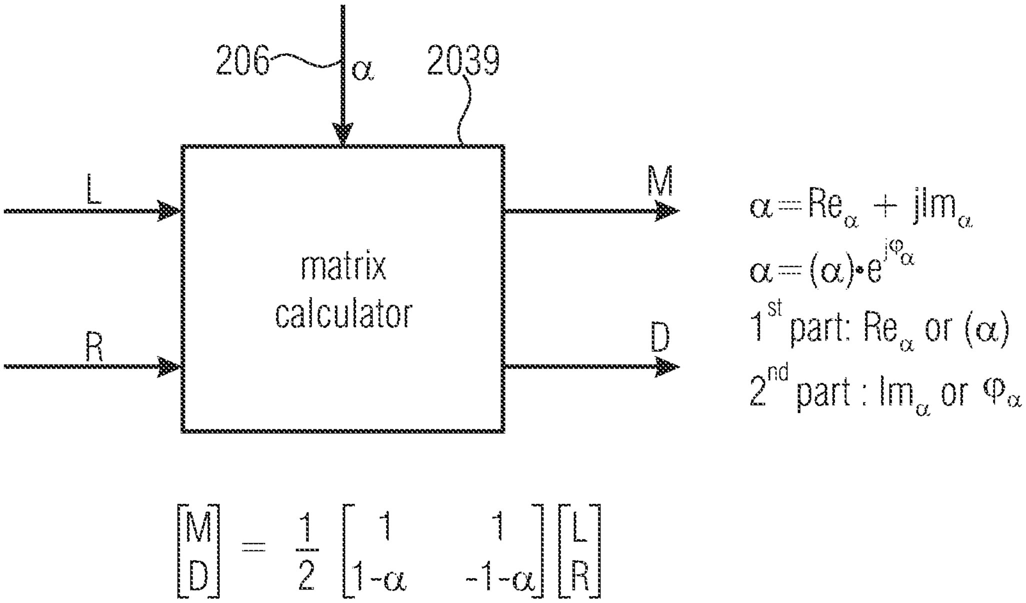
FIG. 11*b* shows a schematic block diagram of an alternative encoder calculator according to an embodiment.
Figure 11C:
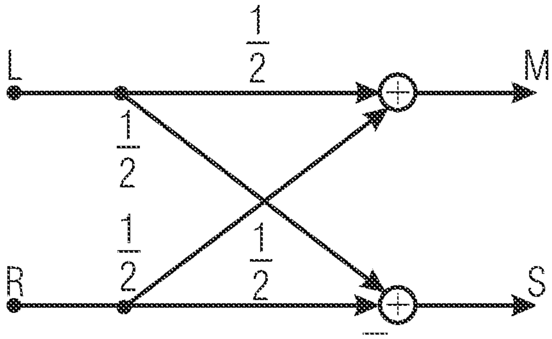
FIG. 11*c* shows a schematic diagram of an exemplary combination rule of a first and a second channel in the combiner according to an embodiment.

The encoder calculator 203 in FIG. 10 can be implemented in different ways, where an exemplary first implementation is illustrated in FIG. 11*a*, in which an explicit combination rule is performed in the combiner 2031. An alternative exemplary implementation is illustrated in FIG. 11*b*, where a matrix calculator 2039 is used. The combiner 2031 in FIG. 11*a* may be implemented to perform the combination rule illustrated in FIG. 11*c*, which is exemplarily the well-known mid/side encoding rule, where a weighting factor of 0.5 is applied to all branches. However, other weighting factors or no weighting factors at all can be implemented depending on the implementation. Additionally, it is to be noted that other combination rules such as other linear combination rules or non-linear combination rules can be applied, as long as there exists a corresponding inverse combination rule which can be applied in the decoder combiner 1162 illustrated in FIG. 12*a*, which applies a combination rule that is inverse to the combination rule applied by the encoder. Due to the joint-stereo prediction, any invertible prediction rule can be used, since the influence on the waveform is "balanced" by the prediction, i.e. any error is included in the transmitted residual signal, since the prediction operation performed by the optimizer 207 in combination with the encoder calculator 203 is a waveform-conserving process.

The combiner 2031 outputs the first combination signal 204 and a second combination signal 2032. The first combination signal is input into a predictor 2033, and the second combination signal 2032 is input into the residual calculator 2034. The predictor 2033 calculates a prediction signal 2035, which is combined with the second combination signal 2032 to finally obtain the residual signal 205. Particularly, the combiner 2031 is configured for combining the two channel signals 201 and 202 of the multichannel audio signal in two different ways to obtain the first combination signal 204 and the second combination signal 2032, where the two different ways are illustrated in an exemplary embodiment in FIG. 11*c*. The predictor 2033 is configured for applying the prediction information to the first combination signal 204 or a signal derived from the first combination signal to obtain the prediction signal 2035. The signal derived from the combination signal can be derived by any non-linear or linear operation, where a real-to-imaginary transform/imaginary-to-real transform is advantageous, which can be implemented using a linear filter such as an FIR filter performing weighted additions of certain values.

The residual calculator 2034 in FIG. 11*a* may perform a subtraction operation so that the prediction signal 2035 is subtracted from the second combination signal. However, other operations in the residual calculator are possible. Correspondingly, the combination signal calculator 1161 in FIG. 12*a* may perform an addition operation where the decoded residual signal 114 and the prediction signal 1163 are added together to obtain the second combination signal 1165.

Figure 12A:
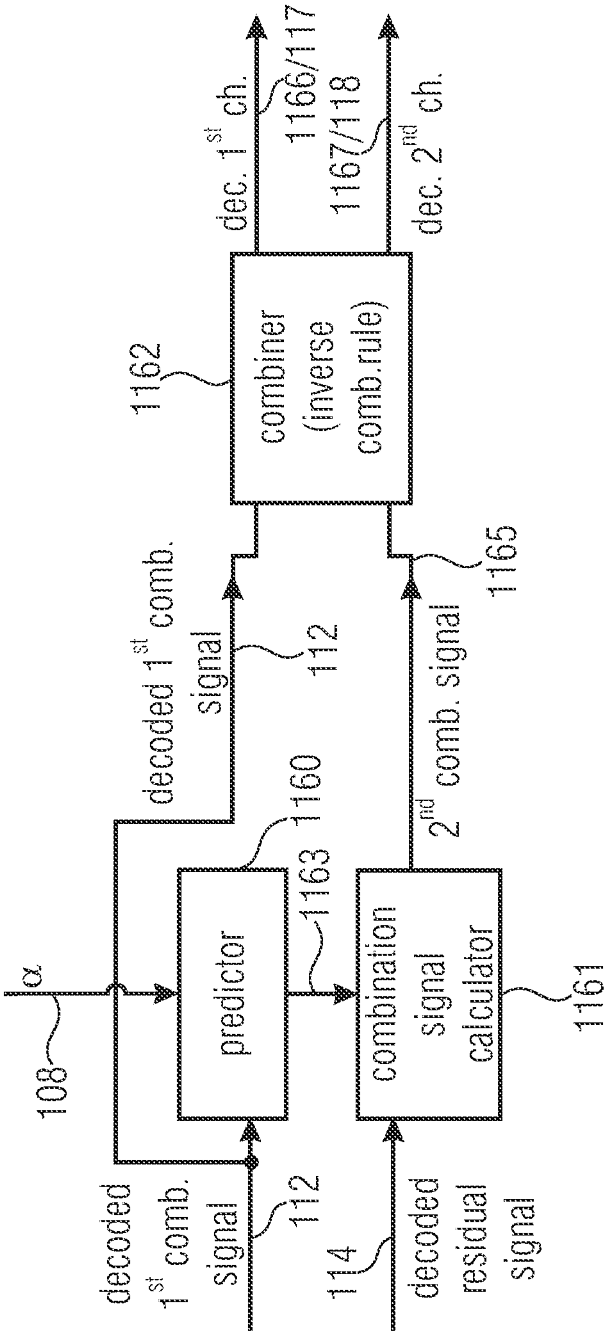
FIG. 12*a* shows a schematic block diagram of a decoder calculator according to an embodiment.
Figure 12B:
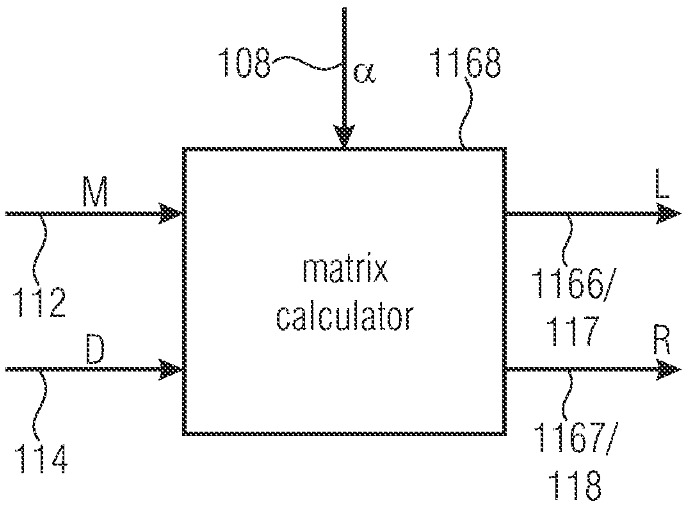
FIG. 12*b* shows a schematic block diagram of a matrix calculator according to an embodiment.

The decoder calculator 116 can be implemented in different manners. A first implementation is illustrated in FIG. 12*a*. This implementation comprises a predictor 1160, a combination signal calculator 1161 and a combiner 1162. The predictor receives the decoded first combination signal 112 and the prediction information 108 and outputs a prediction signal 1163. Specifically, the predictor 1160 is configured for applying the prediction information 108 to the decoded first combination signal 112 or a signal derived from the decoded first combination signal. The derivation rule for deriving the signal to which the prediction information 108 is applied may be a real-to-imaginary transform, or equally, an imaginary-to-real transform or a weighting operation, or depending on the implementation, a phase shift operation or a combined weighting/phase shift operation. The prediction signal 1163 is input together with the decoded residual signal into the combination signal calculator 1161 in order to calculate the decoded second combination signal 1165. The signals 112 and 1165 are both input into the combiner 1162, which combines the decoded first combination signal and the second combination signal to obtain the decoded multichannel audio signal having the decoded first channel signal and the decoded second channel signal on output lines 1166 and 1167, respectively. Alternatively, the decoder calculator is implemented as a matrix calculator 1168 which receives, as input, the decoded first combination signal or signal M, the decoded residual signal or signal D and the prediction information $\alpha$ 108. The matrix calculator 1168 applies a transform matrix illustrated as 1169 to the signals M, D to obtain the output signals L, R, where L is the decoded first channel signal and R is the decoded second channel signal. The notation in FIG. 12*b* resembles a stereo notation with a left channel L and a right channel R. This notation has been applied in order to provide an easier understanding, but it is clear to those skilled in the art that the signals L, R can be any combination of two channel signals in a multichannel signal having more than two channel signals. The matrix operation 1169 unifies the operations in blocks 1160, 1161 and 1162 of FIG. 12*a* into a kind of "single-shot" matrix calculation, and the inputs into the FIG. 12*a* circuit and the outputs from the FIG. 12*a* circuit are identical to the inputs into the matrix calculator 1168 and the outputs from the matrix calculator 1168, respectively.

Figure 12C:
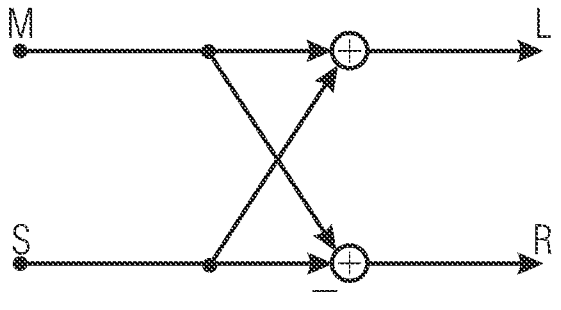
FIG. 12*c* shows a schematic diagram of an exemplary inverse combination rule to the combination rule of FIG. 11*c* according to an embodiment.

FIG. 12*c* illustrates an example for an inverse combination rule applied by the combiner 1162 in FIG. 12*a*. Particularly, the combination rule is similar to the decoder-side combination rule in well-known mid/side coding, where L=M+S, and R=M−S. It is to be understood that the signal S used by the inverse combination rule in FIG. 12*c* is the signal calculated by the combination signal calculator, i.e. the combination of the prediction signal on line 1163 and the decoded residual signal on line 114. It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Figure 13A:
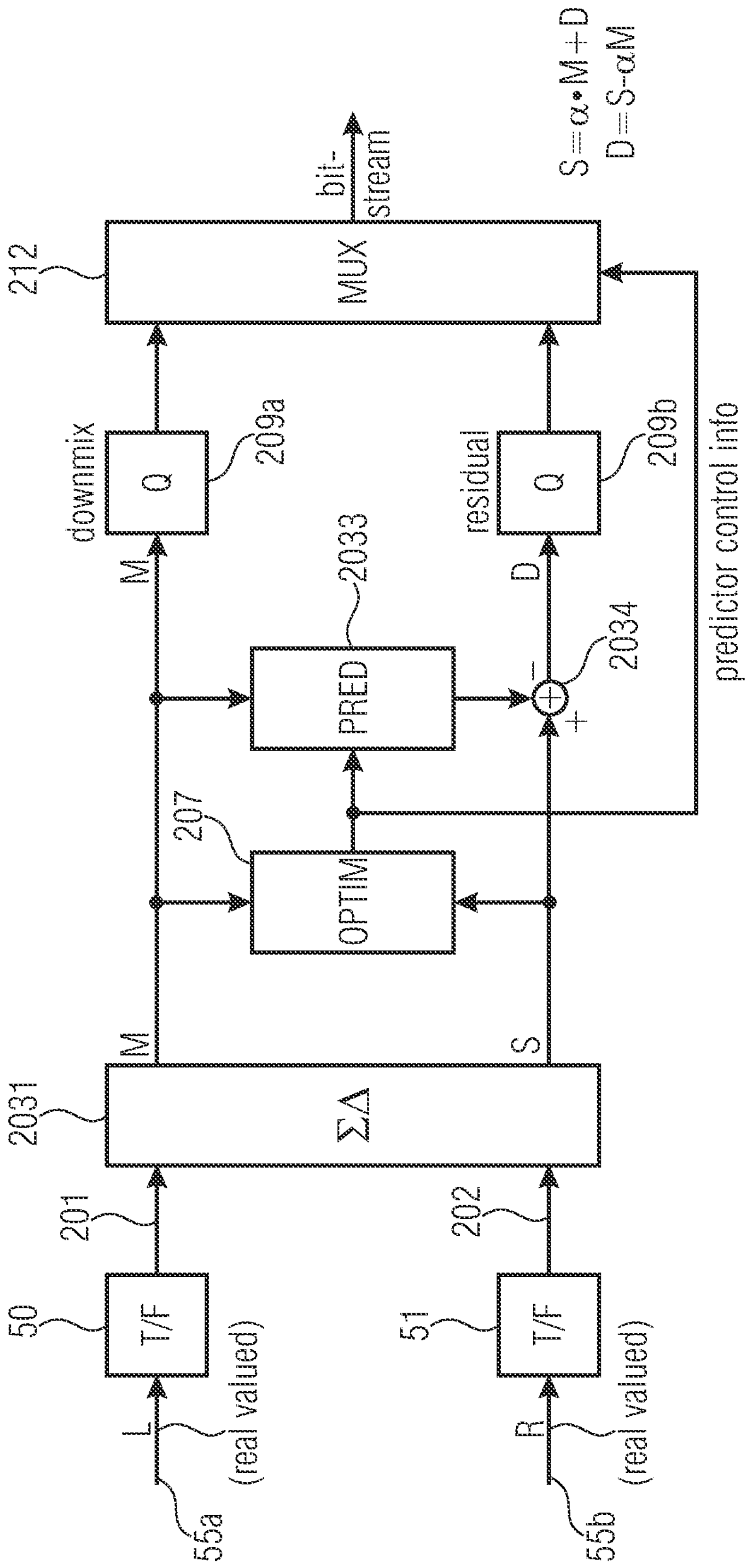
FIG. 13*a* illustrates a schematic block diagram of an implementation of an audio encoder according to an embodiment.

FIG. 13*a* illustrates an implementation of an audio encoder. Compared to the audio encoder illustrated in FIG. 11*a*, the first channel signal 201 is a spectral representation of a time domain first channel signal 55*a*. Correspondingly, the second channel signal 202 is a spectral representation of a time domain channel signal 55*b*. The conversion from the time domain into the spectral representation is performed by a time/frequency converter 50 for the first channel signal and a time/frequency converter 51 for the second channel signal. Advantageously, but not necessarily, the spectral converters 50, 51 are implemented as real-valued converters. The conversion algorithm can be a discrete cosine transform, an FFT transform, where only the real-part is used, an MDCT or any other transform providing real-valued spectral values. Alternatively, both transforms can be implemented as an imaginary transform, such as a DST, an MDST or an FFT where only the imaginary part is used and the real part is discarded. Any other transform only providing imaginary values can be used as well. One purpose of using a pure real-valued transform or a pure imaginary transform is computational complexity, since, for each spectral value, only a single value such as magnitude or the real part has to be processed, or, alternatively, the phase or the imaginary part. In contrast to a fully complex transform such as an FFT, two values, i.e., the real part and the imaginary part for each spectral line would have to be processed which is an increase of computational complexity by a factor of at least 2. Another reason for using a real-valued transform here is that such a transform sequence is usually critically sampled even in the presence of inter-transform overlap, and hence provides a suitable (and commonly used) domain for signal quantization and entropy coding (the standard "perceptual audio coding" paradigm implemented in "MP3", AAC, or similar audio coding systems).

FIG. 13*a* additionally illustrates the residual calculator 2034 as an adder which receives the side signal at its "plus" input and which receives the prediction signal output by the predictor 2033 at its "minus" input. Additionally, FIG. 13*a* illustrates the situation that the predictor control information is forwarded from the optimizer to the multiplexer 212 which outputs a multiplexed bitstream representing the encoded multichannel audio signal. Particularly, the prediction operation is performed in such a way that the side signal is predicted from the mid signal as illustrated by the Equations to the right of FIG. 13*a*.

The predictor control information 206 is a factor as illustrated to the right in FIG. 11*b*. In an embodiment in which the prediction control information only comprises a real portion such as the real part of a complex-valued α or a magnitude of the complex-valued α, where this portion corresponds to a factor different from zero, a significant coding gain can be obtained when the mid signal and the side signal are similar to each other due to their waveform structure, but have different amplitudes.

When, however, the prediction control information only comprises a second portion which can be the imaginary part of a complex-valued factor or the phase information of the complex-valued factor, where the imaginary part or the phase information is different from zero, the present invention achieves a significant coding gain for signals which are phase shifted to each other by a value different from 0° or 180°, and which have, apart from the phase shift, similar waveform characteristics and similar amplitude relations.

A prediction control information is complex-valued. Then, a significant coding gain can be obtained for signals being different in amplitude and being phase shifted. In a situation in which the time/frequency transforms provide complex spectra, the operation 2034 would be a complex operation in which the real part of the predictor control information is applied to the real part of the complex spectrum M and the imaginary part of the complex prediction information is applied to the imaginary part of the complex spectrum. Then, in adder 2034, the result of this prediction operation is a predicted real spectrum and a predicted imaginary spectrum, and the predicted real spectrum would be subtracted from the real spectrum of the side signal S (band-wise), and the predicted imaginary spectrum would be subtracted from the imaginary part of the spectrum of S to obtain a complex residual spectrum D.

The time-domain signals L and R are real-valued signals, but the frequency-domain signals can be real- or complex-valued. When the frequency-domain signals are real-valued, then the transform is a real-valued transform. When the frequency domain signals are complex, then the transform is a complex-valued transform. This means that the input to the time-to-frequency and the output of the frequency-to-time transforms are real-valued, while the frequency domain signals could e.g. be complex-valued QMF-domain signals.

Figure 13B:
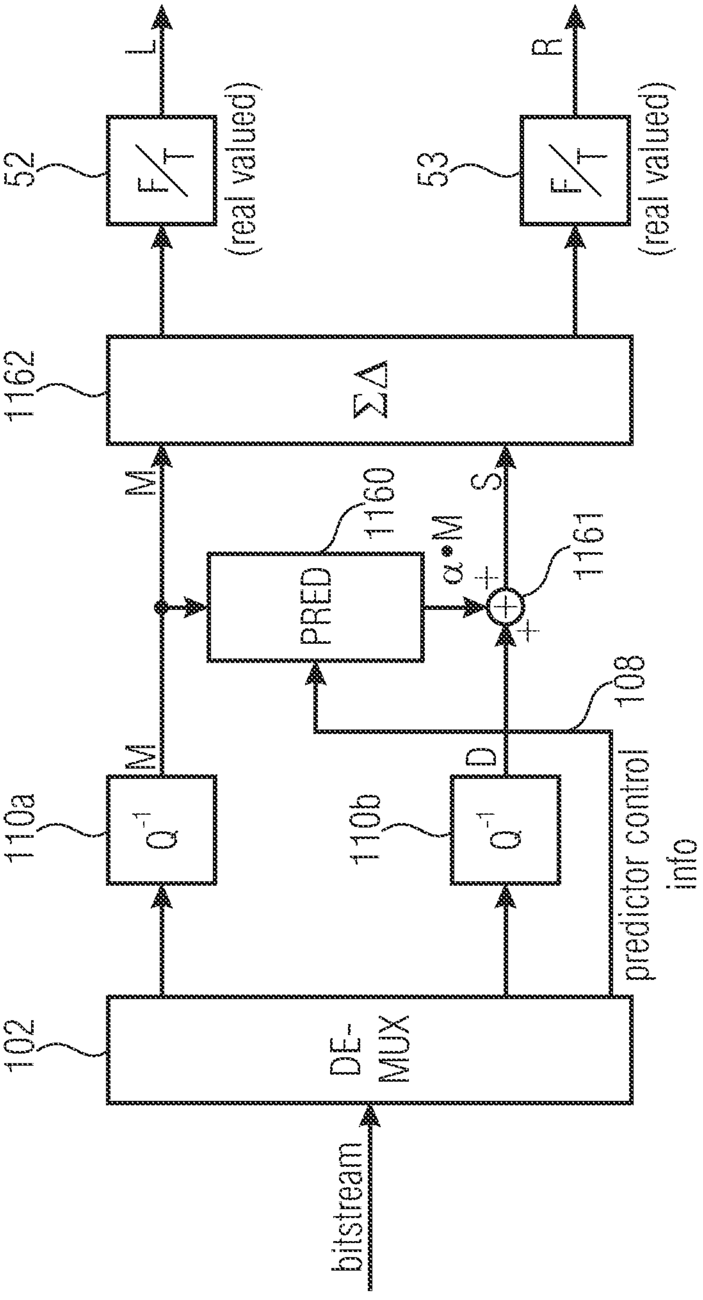
FIG. 13*b* illustrates a schematic block diagram of an audio decoder corresponding to the audio encoder illustrated in FIG. 13*a* according to an embodiment.

FIG. 13*b* illustrates an audio decoder corresponding to the audio encoder illustrated in FIG. 13*a*.

The bitstream output by bitstream multiplexer 212 in FIG. 13*a* is input into a bitstream demultiplexer 102 in FIG. 13*b*. The bitstream demultiplexer 102 demultiplexes the bitstream into the downmix signal M and the residual signal D. The downmix signal M is input into a dequantizer 110*a*. The residual signal D is input into a dequantizer 110*b*. Additionally, the bitstream demultiplexer 102 demultiplexes a predictor control information 108 from the bitstream and inputs same into the predictor 1160. The predictor 1160 outputs a predicted side signal a M and the combiner 1161 combines the residual signal output by the dequantizer 110*b* with the predicted side signal in order to finally obtain the reconstructed side signal S. The side signal is then input into the combiner 1162 which performs, for example, a sum/difference processing, as illustrated in FIG. 12*c* with respect to the mid/side encoding. Particularly, block 1162 performs an (inverse) mid/side decoding to obtain a frequency-domain representation of the left channel and a frequency-domain representation of the right channel. The frequency-domain representation is then converted into a time domain representation by corresponding frequency/time converters 52 and 53.

Depending on the implementation of the system, the frequency/time converters 52, 53 are real-valued frequency/time converters when the frequency-domain representation is a real-valued representation, or complex-valued frequency/time converters when the frequency-domain representation is a complex-valued representation.

Figure 14A:
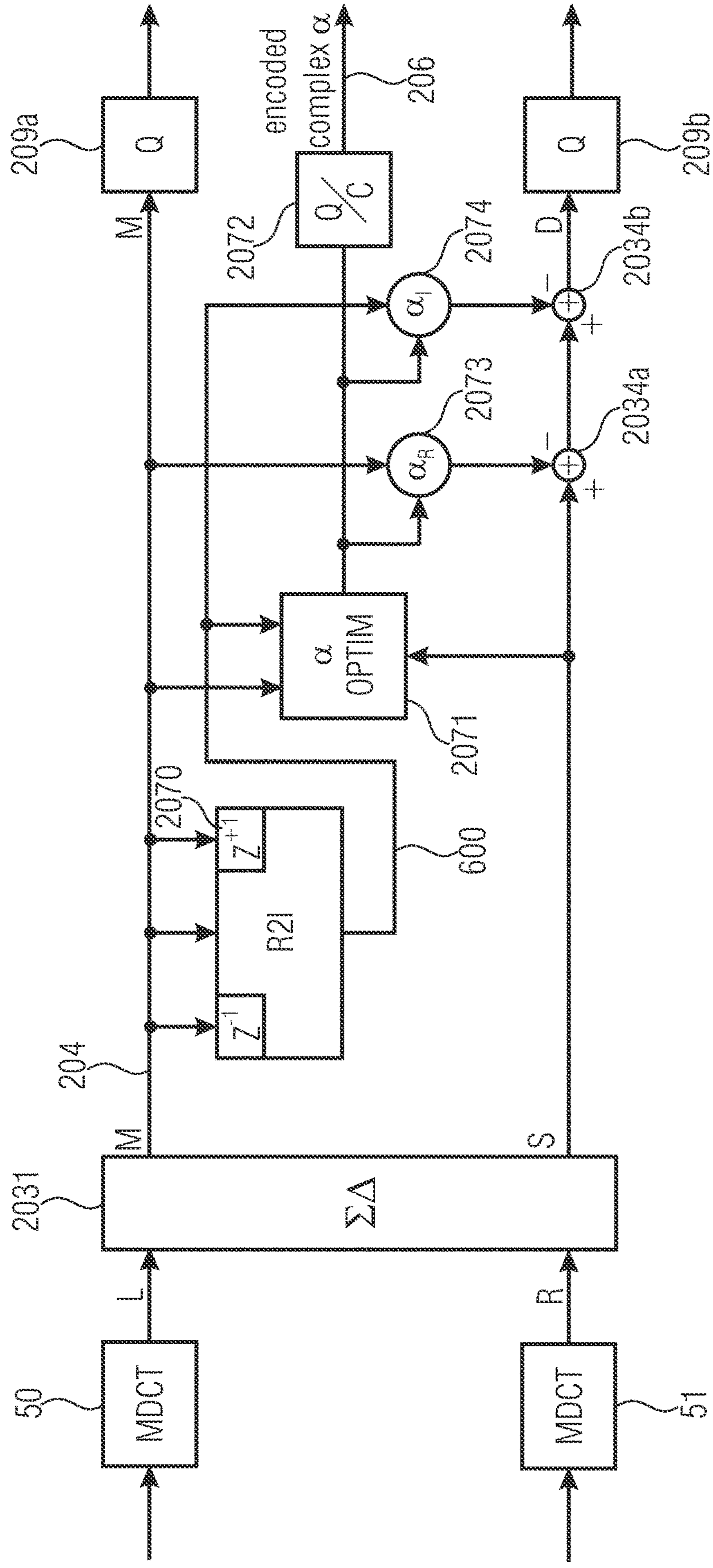
FIG. 14*a* illustrates a schematic block diagram of a further implementation of an audio encoder according to an embodiment.
Figure 14B:
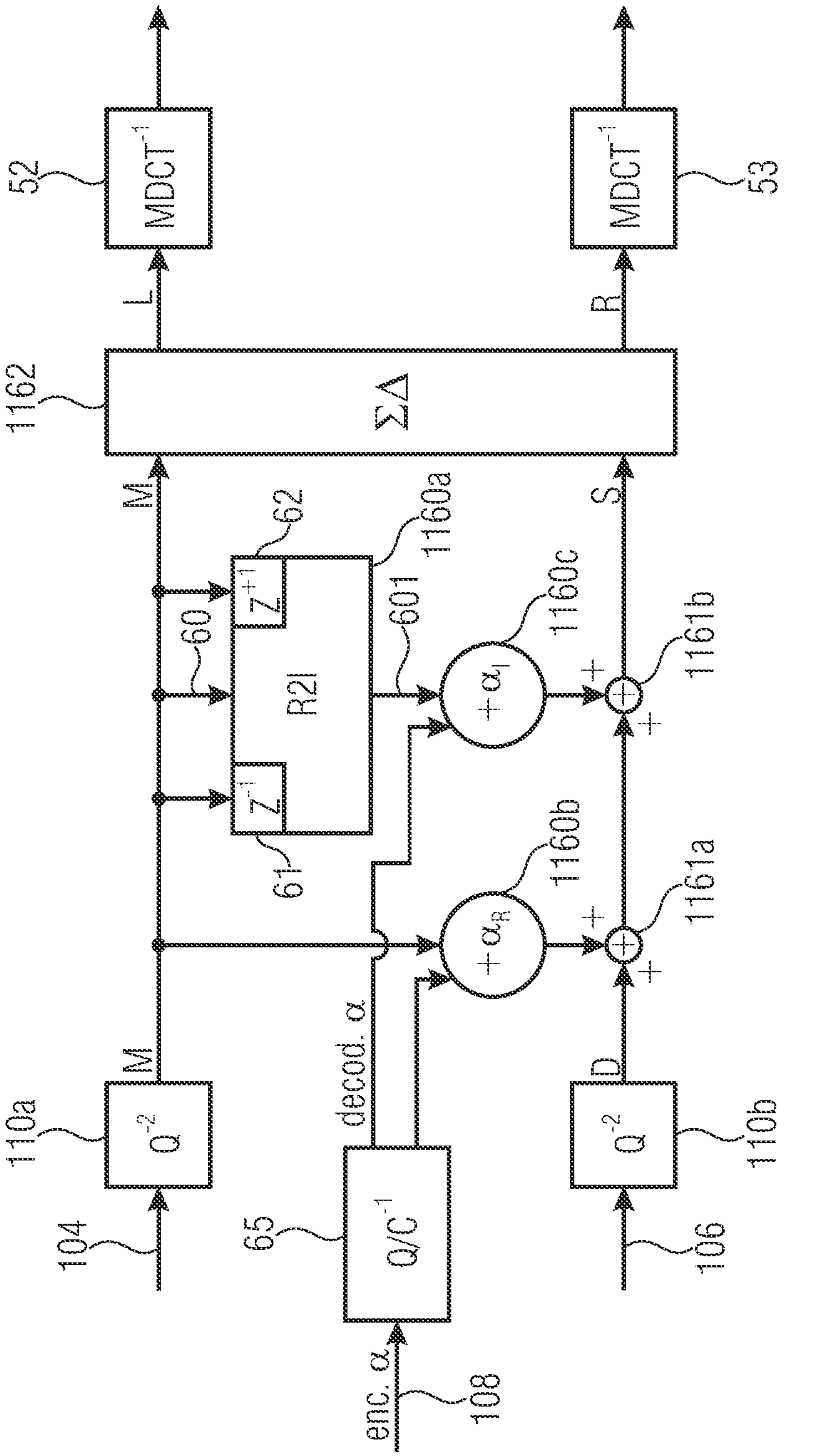
FIG. 14*b* illustrates a schematic block diagram of an audio decoder corresponding to the audio encoder illustrated in FIG. 14*a* according to an embodiment.

For increasing efficiency, however, performing a real-valued transform is advantageous as illustrated in another implementation in FIG. 14*a* for the encoder and FIG. 14*b* for the decoder. The real-valued transforms 50 and 51 are implemented by an MDCT, i.e. an MDCT-IV, or alternatively and according to the present invention, an MDCT-II or MDST-II or an MDST-IV. Additionally, the prediction information is calculated as a complex value having a real part and an imaginary part. Since both spectra M, S are real-valued spectra, and since, therefore, no imaginary part of the spectrum exists, a real-to-imaginary converter 2070 is provided which calculates an estimated imaginary spectrum 600 from the real-valued spectrum of signal M. This real-to-imaginary transformer 2070 is a part of the optimizer 207, and the imaginary spectrum 600 estimated by block 2070 is input into the α optimizer stage 2071 together with the real spectrum M in order to calculate the prediction information 206, which now has a real-valued factor indicated at 2073 and an imaginary factor indicated at 2074. Now, in accordance with this embodiment, the real-valued spectrum of the first combination signal M is multiplied by the real part $\alpha_R$ 2073 to obtain the prediction signal which is then subtracted from the real-valued side spectrum. Additionally, the imaginary spectrum 600 is multiplied by the imaginary part $\alpha_I$ illustrated at 2074 to obtain the further prediction signal, where this prediction signal is then subtracted from the real-valued side spectrum as indicated at 2034*b*. Then, the prediction residual signal D is quantized in quantizer 209*b*, while the real-valued spectrum of M is quantized/encoded in block 209*a*. Additionally, it is advantageous to quantize and encode the prediction information α in the quantizer/entropy encoder 2072 to obtain the encoded complex α value which is forwarded to the bitstream multiplexer 212 of FIG. 13*a*, for example, and which is finally input into a bitstream as the prediction information.

Concerning the position of the quantization/coding (Q/C) module 2072 for α, it is noted that the multipliers 2073 and 2074 use exactly the same (quantized) α that will be used in the decoder as well. Hence, one could move 2072 directly to the output of 2071, or one could consider that the quantization of α is already taken into account in the optimization process in 2071.

Although one could calculate a complex spectrum on the encoder-side, since all information is available, it is advantageous to perform the real-to-complex transform in block 2070 in the encoder so that similar conditions with respect to a decoder illustrated in FIG. 14*b* are produced. The decoder receives a real-valued encoded spectrum of the first combination signal and a real-valued spectral representation of the encoded residual signal. Additionally, an encoded complex prediction information is obtained at 108, and an entropy-decoding and a dequantization is performed in block 65 to obtain the real part $\alpha_R$ illustrated at 1160*b* and the imaginary part $\alpha_I$ illustrated at 1160*c*. The mid signals output by weighting elements 1160*b* and 1160*c* are added to the decoded and dequantized prediction residual signal. Particularly, the spectral values input into weighter 1160*c*, where the imaginary part of the complex prediction factor is used as the weighting factor, are derived from the real-valued spectrum M by the real-to-imaginary converter 1160*a*, which is implemented in the same way as block 2070 from FIG. 14*a* relating to the encoder side. On the decoder-side, a complex-valued representation of the mid signal or the side signal is not available, which is in contrast to the encoder-side. The reason is that only encoded real-valued spectra have been transmitted from the encoder to the decoder due to bit rates and complexity reasons.

The real-to-imaginary transformer 1160*a* or the corresponding block 2070 of FIG. 14*a* can be implemented as published in WO 2004/013839 A1 or WO 2008/014853 A1 or U.S. Pat. No. 6,980,933. Alternatively, any other implementation known in the art can be applied.

Embodiments further show how the proposed adaptive transform kernel switching can be employed advantageously in an audio codec like HE-AAC to minimize or even avoid the two issues mentioned in the "Problem Statement" section. Following will be addressed stereo signals with roughly 90 degrees of inter-channel phase shift. Here a switching to an MDST-IV based coding may be employed in one of the two channels, while old-fashioned MDCT-IV coding may be used in the other channel. Alternatively, MDCT-II coding may be used in one channel and MDST-II coding in the other channel. Given that the cosine and sine functions are 90-degree phase-shifted variants of each other ($\cos(x)=\sin(x+\pi/2)$), a corresponding phase shift between the input channel spectra can in this way be converted into a 0-degree or 180-degree phase shift, which can be coded very efficiently via traditional M/S-based joint stereo coding. As in the previous case for highly harmonic signals suboptimally coded by the classical MDCT, intermediate transition transforms might be advantageous in the affected channel.

In both cases, for highly harmonic signals and stereo signals with roughly 90° of inter-channel phase shift, the encoder selects one of the 4 kernels for each transform (see also FIG. 7). A respective decoder applying the inventive transform kernel switching may use the same kernels so it can properly reconstruct the signal. In order for such a decoder to know which transform kernel to use in one or more inverse transforms in a given frame, side-information describing the choice of transform kernel or, alternatively, left and right-side symmetry, should be transmitted by the corresponding encoder at least once for each frame. The next section describes an envisioned integration into (i.e. amendment to) the MPEG-H 3D Audio codec.

Further embodiments relate to audio coding and, in particular, to low-rate perceptual audio coding by means of lapped transforms such as the modified discrete cosine transform (MDCT). Embodiments relate two specific issues concerning conventional transform coding by generalizing the MDCT coding principle to include three other, similar transforms. Embodiments further show a signal- and context-adaptive switching between these four transform kernels in each coded channel or frame, or separately for each transform in each coded channel or frame. To signal the kernel choice to a corresponding decoder, respective side-information may be transmitted in the coded bitstream.

Figure 15:
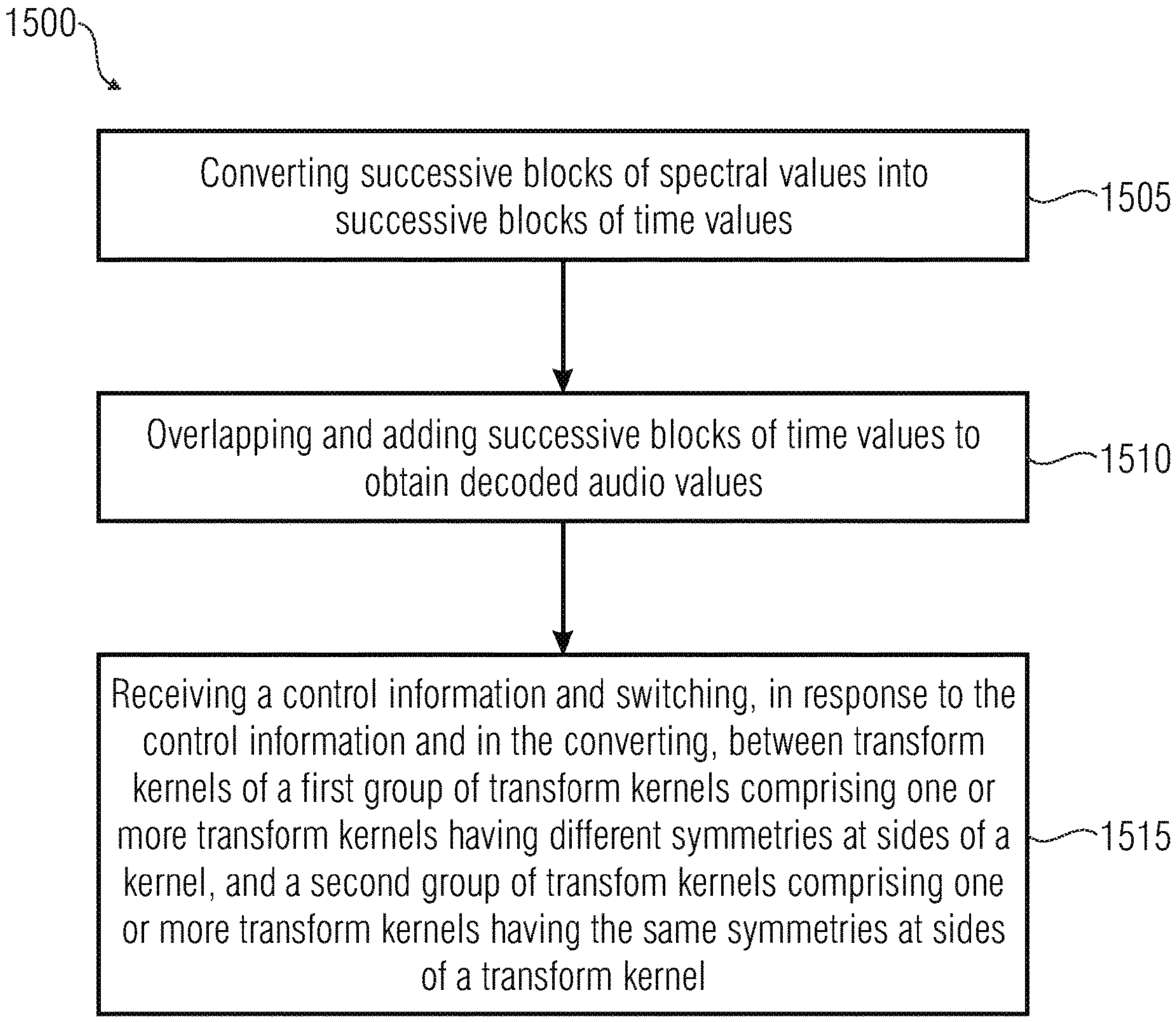
FIG. 15 shows a schematic block diagram of a method of decoding an encoded audio signal.

FIG. 15 shows a schematic block diagram of a method 1500 of decoding an encoded audio signal. The method 1500 comprises a step 1505 of converting successive blocks of spectral values into overlapping successive blocks of time values, a step 1510 of overlapping and adding successive blocks of time values to obtain decoded audio values, and a step 1515 of receiving a control information and switching, in response to the control information and in the converting, between transform kernels of a first group of transform kernels comprising one or more transform kernels having different symmetries at sides of a kernel, and a second group comprising one or more transform kernels having the same symmetries at sides of a transform kernel.

Figure 16:
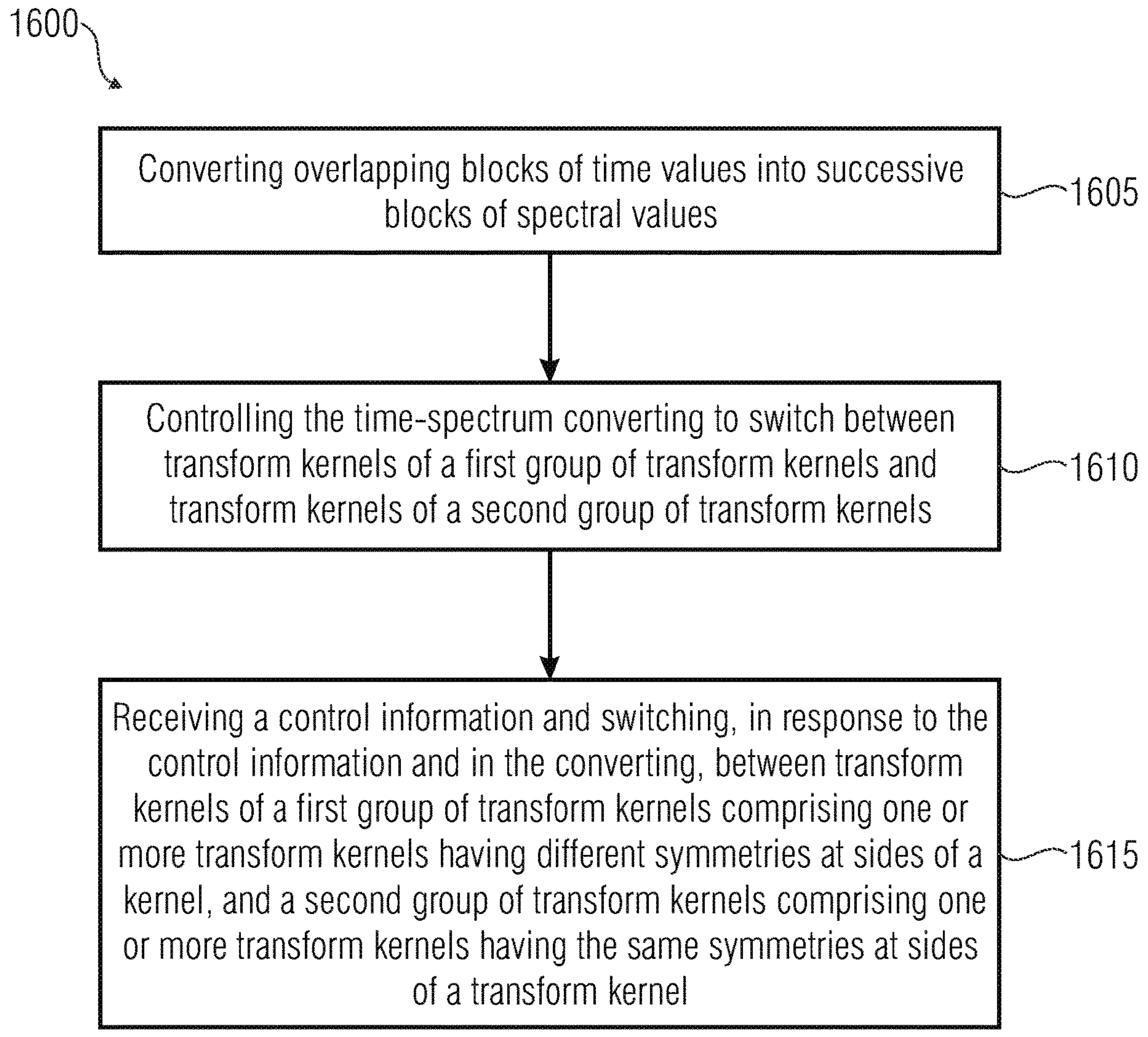
FIG. 16 shows a schematic block diagram of a method of encoding an audio signal.

FIG. 16 shows a schematic block diagram of a method 1600 of encoding an audio signal. The method 1600 comprises a step 1605 of converting overlapping blocks of time values into successive blocks of spectral values, a step 1610 of controlling the time-spectrum converting to switch between transform kernels of a first group of transform kernels and transform kernels of a second group of transform kernels, and a step 1615 of receiving a control information and switching, in response to the control information and in the converting, between transform kernels of a first group of transform kernels comprising one or more transform kernels having different symmetries at sides of a kernel, and a second group of transform kernels comprising one or more transform kernels having the same symmetries at sides of a transform kernel.

It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the Internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

A further embodiment comprises a decoder for decoding an encoded audio signal comprises:

an adaptive spectrum-time converter for converting successive blocks of spectral values into successive blocks of time values; and an overlap-add-processor for overlapping and adding successive blocks of time values to obtain decoded audio values, wherein the adaptive spectrum-time converter is configured to receive a control information and to switch, in response to the control information, between transform kernels of a first group of transform kernels comprising one or more transform kernels having different symmetries at sides of a kernel, and a second group of transform kernels comprising one or more transform kernels having the same symmetries at sides of a transform kernel.

A further embodiment comprises a decoder as in the immediately preceding embodiment, wherein the first group of transform kernels has one or more transform kernels having an odd symmetry at a left side and an even symmetry at the right side of the kernel or vice versa, or wherein the second group of transform kernels has one or more transform kernels having an even symmetry at both sides or an odd symmetry at both sides of the kernel.

A further embodiment comprises a decoder as in any of the two immediately preceding embodiments, wherein the first group of transform kernels comprises an inverse MDCT-IV transform kernel or an inverse MDST-IV transform kernel, or wherein the second group of transform kernels comprises an inverse MDCT-II transform kernel or an inverse MDST-II transform kernel.

A further embodiment comprises a decoder as in any of the three immediately preceding embodiments, wherein the transform kernel of the first group and the second group is based on the following equation:

$$x_{i,n} = C\sum_{k=0}^{M-1} spec[i][k]cs\left(\frac{2\pi}{N}(n+n_0)(k+k_0)\right)$$

wherein the at least one transform kernel of the first group is based on the parameters:

$cs(\,)-\cos(\,)$ and $k_0=0.5$ or $cs(\,)=\sin(\,)$ and $k_0=0.5$, or wherein the at least one transform kernel of the second group is based on the parameters:

$cs(\,)=\cos(\,)$ and $k_0=0$; or $cs(\,)=\sin(\,)$ and $k_0=1$, wherein $x_{iin}$ is a time domain output, C is a constant parameter, N is a time-window length, spec are spectral values having M values for a block, M is equal to N/2, i is a time block index, k is a spectral index indicating a spectral values, n is a time index indicating a time value in a block i, and no is a constant parameter being an integer number or zero.

A further embodiment comprises a decoder as in any of the four immediately preceding embodiments, wherein the control information comprises a current bit indicating a current symmetry for a current frame, and wherein the adaptive spectrum-time converter is configured to not switch from the first group to the second group, when the current bit indicates the same symmetry as was used in a preceding frame, and wherein the adaptive spectrum-time converter is configured to switch from the first group to the second group, when the current bit indicates a different symmetry as was used in the preceding frame.

A further embodiment comprises a decoder as in any of the five immediately preceding embodiments, wherein the adaptive spectrum-time converter is configured to switch the second group into the first group, when a current bit indicating a current symmetry for a current frame indicates the same symmetry as was used in the preceding frame, and wherein the adaptive spectrum-time converter is configured to not switch from the second group into the first group, when the current bit indicates a current symmetry for the current frame having a different symmetry as was used in the preceding frame.

A further embodiment comprises a decoder as in any of the six immediately preceding embodiments, wherein the adaptive spectrum-time converter is configured to read from the encoded audio signal the control information for a previous frame and a control information for a current frame following the previous frame from the encoded audio signal in a control data section for the current frame, or wherein the adaptive spectrum-time converter is configured to read the control informationfrom the control data section for the current frame and to retrieve the control information for the previous frame from a control data section of the previous frame or from a decoder setting applied to the previous frame.

A further embodiment comprises a decoder as in any of the seven immediately preceding embodiments, wherein the adaptive spectrum-time converter is configured to apply the transform kernel based on the following table:

| | current frame i | |
|---|---|---|
| last frame i − 1 | right-side symmetry even ($symm_i = 0$) | right-side symmetry odd ($symm_i = 1$) |
| right-side symmetry odd ($symm_{i-1} = 1$) | cs(. . .) = cos(. . .) $k_0 = 0.0$ | cs(. . .) = sin(. . .) $k_0 = 0.5$ |
| right-side symmetry even ($symm_{i-1} = 0$) | cs(. . .) = cos(. . .) $k_0 = 0.5$ | cs(. . .) = sin(. . .) $k_0 = 1.0$ |

wherein $symm_i$ is the control information for the current frame at index i, and wherein symm is the control information for the previous frame at index i−1.

A further embodiment comprises a decoder as in any of the eight immediately preceding embodiments which further comprises a multichannel processor for receiving blocks of spectral values representing a first and a second multichannel and for processing, in accordance with a joint multichannel processing technique, the received blocks to obtain processed blocks of spectral values for the first multichannel and the second multichannel, and wherein the adaptive spectrum-time processor is configured to process the processed blocks for the first multichannel using control information for the first multichannel and the processed blocks for the second multichannel using control information for the second multichannel.

A further embodiment comprises a decoder as in the immediately preceding embodiment, wherein the multichannel processor is configured to apply complex prediction using a complex prediction control information associated with the blocks of spectral values representing the first and the second multichannel.

A further embodiment comprises a decoder as in any of the two immediately preceding embodiments, wherein the multichannel processor is configured to process, in accordance with the joint multichannel processing technique, the received blocks, wherein the received blocks comprise an encoded residual signal of a representation of the first multichannel and a representation of the second multichannel and wherein the multichannel processor is configured to calculate the first multichannel signal and the second multichannel signal using the residual signal and a further encoded signal.

A further embodiment comprises an encoder for encoding an audio signal where the encoder comprises:

adaptive time-spectrum converter for converting overlapping blocks of time values into successive blocks of spectral values; and a controller for controlling the time-spectrum converter to switch between transform kernels of a first group of transform kernels and transform kernels of a second group of transform kernels, wherein the adaptive time-spectrum converter is configured to receive a control information and to switch, in response to the control information, between transform kernels of a first group of transform kernels comprising one or more transform kernels having different symmetries at sides of a kernel, and a second group of transform kernels comprising one or mare transform kernels having the same symmetries at sides of a transform kernel.

A further embodiment comprises an encoder as the immediately preceding embodiment which further comprises an output interface for generating an encoded audio signal having, for a current frame, a control information indicating a symmetry of the transform kernel used for generating the current frame.

A further embodiment comprises an encoder as in any of the two immediately preceding embodiments, wherein the output interface is configured to include into a control data section of the current frame a symmetry information for the current frame and for the previous frame, when the current frame is an independent frame, or to include in the control data section of the current frame, any symmetry information for the current frame and no symmetry information for the previous frame, when the current frame is a dependent frame.

A further embodiment comprises an encoder as in any of the three immediately preceding embodiments, wherein the first group of transform kernels has one or more transform kernels having an odd symmetry at a left side and an even symmetry at the right side or vice versa, or wherein the second group of transform kernels has one or more transform kernels having an even symmetry at both sides or an odd symmetry at both skies.

A further embodiment comprises an encoder as in any of the four immediately preceding embodiments, wherein the first group of transform kernels comprises an MDCT-IV transform kernel or an MDST-IV transform kernel, or wherein the second group of transform kernels comprises an MDCT-II transform kernel or an MDST-II transform kernel.

A further embodiment comprises an encoder as in any of the five immediately preceding embodiments, wherein the controller is configured so that an MDCT-IV should be followed by an MDCT-IV or an MDST-II, or wherein an MDST-IV should be followed by an MDST-IV or an MDCT-II, or wherein the MDCT-II should be followed by an MDCT-IV or an MDST-II, or wherein the MDST-II should be followed by an MDST-IV or an MDCT-II.

A further embodiment comprises an encoder as in any of the six immediately preceding embodiments, wherein the controller is configured to analyze the overlapping blocks of time values having a first channel and a second channel to determine the transform kernel for a frame of the first channel and a corresponding frame of the second channel.

A further embodiment comprises an encoder as in any of the seven immediately preceding embodiments, wherein the time-spectrum converter is configured to process a first channel and a second channel of a multichannel signal and wherein the encoder further comprises a multichannel processor for processing the successive blocks of spectral values of the first channel and the second channel using a joint multichannel processing technique to obtain processed blocks of spectral values, and an encoding processor for processing the processed blocks of spectral values to obtain encoded channels.

A further embodiment comprises an encoder as in any of the eighteen immediately preceding embodiments, wherein the first processed blocks of spectral values represent a first encoded representation of the joint multichannel processing technique and the second processed blocks of spectral values represent a second encoded representation of the joint multichannel processing technique, wherein the encoding processor is configured to process the first processed blocks using quantization and entropy encoding to form a first encoded representation and wherein the encoding processor is configured to process the second processed blocks using quantization and entropy encoding to form a second encoded representation, wherein encoding processor is configured to form a bitstream of the encoded audio signal using the first encoded representation and the second encoded representation.

A further embodiment comprises a method of decoding an encoded audio signal, the method comprising: converting successive blocks of spectral values into successive blocks of time values; and overlapping and adding successive blocks of time values to obtain decoded audio values, receiving a control information and switching, in response to the control information and in the converting, between transform kernels of a first group of transform kernels comprising one or more transform kernels having different symmetries at sides of a kernel, and a second group of transform kernels comprising one or more transform kernels having the same symmetries at skies of a transform kernel.

A further embodiment comprises a method of encoding an audio signal, the method comprising converting overlapping blocks of time values into successive blocks of spectral values; and controlling the time-spectrum converting to switch between transform kernels of a first group of transform kernels and transform kernels of a second group of transform kernels, receiving a control information and switching, in response to the control information and in the converting, between transform kernels of a first group of transform kernels comprising one or more transform kernels having different symmetries at sides of a kernel, and a second group of transform kernels comprising one or more transform kernels having the same symmetries at sides of a transform kernel.

A further embodiment comprises a computer program for performing, when running on a computer or a processor, the methods of any of the two immediately preceding embodiments.

A further embodiment an apparatus, method or computer program of any of the twenty immediately preceding embodiments, wherein multichannel processing means a joint stereo processing or a joint processing of more than two channels, and wherein a multichannel signal has two channels or more than two channels.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] H. S. Malvar, *Signal Processing with Lapped Transforms*, Norwood: Artech House, 1992.

[2] J. P. Princen and A. B. Bradley, "Analysis/Synthesis Filter Bank Design Based on Time Domain Aliasing Cancellation," *IEEE Trans. Acoustics, Speech, and Signal Proc.*, 1986.

[3] J. P. Princen, A. W. Johnson, and A. B. Bradley, "Subband/transform coding using filter bank design based on time domain aliasing cancellation," in *IEEE ICASSP*, vol. 12, 1987.

[4] H. S. Malvar, "Lapped Transforms for Efficient Transform/Subband Coding," *IEEE Trans. Acoustics, Speech, and Signal Proc.*, 1990.

[5] http://en.wikipedia.org/wiki/Modified_discrete_cosine_transform

The invention claimed is:

1. Decoder for decoding an encoded audio signal, the decoder comprising:

an adaptive spectrum-time converter for converting successive blocks of spectral values into successive blocks of time values; and an overlap-add-processor for overlapping and adding the successive blocks of time values to acquire decoded audio values, wherein the adaptive spectrum-time converter is configured to receive a control information and to signal-adaptively change, in response to the control information, between a transform kernel of a first group of transform kernels comprising one or more transform kernels, and a transform kernel of a second group of transform kernels comprising one or more transform kernels, wherein the transform kernel of the first group of transform kernels and the transform kernel of the second group of transform kernels are based on the following equation:

$$x_{i,n} = C\sum_{k=0}^{M-1} spec[i][k]cs\left(\frac{2\pi}{N}(n+n_0)(k+k_0)\right),$$

wherein $x_{i,n}$ is a time domain output, C is a constant parameter, N is a time-window length, spec are spectral values comprising M values for a block, i is a time block index, k is a spectral index, n is a time index, $n_o$ is a constant parameter being an integer number or zero, and cs( . . . ) indicates a cosine function or a sine function and wherein $k_0$ and cs( . . . ) are chosen signal-adaptively.

2. Decoder of claim 1, wherein the first group of transform kernels comprises one or more transform kernels comprising an odd symmetry at a left side and an even symmetry at a right side of the transform kernel or vice versa.

3. Decoder of claim 1, wherein the first group of transform kernels comprises an inverse MDCT-IV transform kernel or an inverse MDST-IV transform kernel, wherein the inverse MDCT-IV transform kernel shows an odd symmetry at a left side and an even symmetry at a right side, and a synthesized signal is inverted at the left side during signal fold-out of the transform, wherein the inverse MDST-IV transform kernel shows an even symmetry at a left side and an odd symmetry at a right side, and a synthesized signal is inverted at the right side during signal fold-out of the transform.

4. Decoder of claim 1, wherein the transform kernel of the first group of transform kernels is based on the parameters:

$cs(\ )=\cos(\ )$ and $k_0=0.5$ or $cs(\ )=\sin(\ )$ and $k_0=0.5$, or wherein the transform kernel of the second group of transform kernels is based on the parameters:

$cs(\ )=\cos(\ )$ and $k_0=0$; or $cs(\ )=\sin(\ )$ and $k_0=1$.

5. Decoder of claim 1, wherein the control information comprises a current bit indicating a current symmetry for a current frame, and wherein the adaptive spectrum-time converter is configured to not change from the first group to the second group, when the current bit indicates an equal symmetry as was used in a previous frame, and wherein the adaptive spectrum-time converter is configured to signal-adaptively change from the first group to the second group, when the current bit indicates a different symmetry as was used in the previous frame.

6. Decoder of claim 1, wherein the adaptive spectrum-time converter is configured to signal-adaptively change the second group into the first group, when a current bit indicating a current symmetry for a current frame indicates an equal symmetry as was used in the previous frame, and wherein the adaptive spectrum-time converter is configured to not change from the second group into the first group, when the current bit indicates a current symmetry for the current frame comprising a different symmetry as was used in the previous frame.

7. Decoder of claim 1, wherein the adaptive spectrum-time converter is configured to read from the encoded audio signal the control information for a previous frame and the control information for a current frame following the previous frame from the encoded audio signal in a control data section for the current frame, or wherein the adaptive spectrum-time converter is configured to read the control information from the control data section for the current frame and to retrieve the control information for the previous frame from a control data section of the previous frame or from a decoder setting applied to the previous frame.

8. Decoder of claim 1, wherein the adaptive spectrum-time converter is configured to apply the transform kernel based on the following table:

| | current frame i | |
|---|---|---|
| previous frame i − 1 | right-side symmetry even ($symm_i = 0$) | right-side symmetry odd ($symm_i = 1$) |
| right-side symmetry odd ($symm_{i-1} = 1$) | cs(. . .) = cos(. . .) $k_0 = 0.0$ | cs(. . .) = sin(. . .) $k_0 = 0.5$ |
| right-side symmetry even ($symm_{i-1} = 0$) | cs(. . .) = cos(. . .) $k_0 = 0.5$ | cs(. . .) = sin(. . .) $k_0 = 1.0$ |

wherein $symm_i$ is the control information for the current frame at index i, and wherein $symm_{i-1}$ is the control information for the previous frame at index i−1.

9. Decoder of claim 1, further comprising a multichannel processor for receiving blocks of spectral values representing a first and a second multichannel and for processing, in accordance with a joint multichannel processing technique, the received blocks to acquire processed blocks of spectral values for the first multichannel and the second multichannel, and wherein the adaptive spectrum- time converter is configured to process the processed blocks for the first multichannel using control information for the first multichannel and the processed blocks for the second multichannel using control information for the second multichannel.

10. Decoder of claim 9, wherein the multichannel processor is configured to apply complex prediction using a complex prediction control information associated with the blocks of spectral values representing the first and the second multichannel.

11. Decoder of claim 9, wherein the multichannel processor is configured to process, in accordance with the joint multichannel processing technique, the received blocks, wherein the received blocks comprise an encoded residual signal of a representation of the first multichannel and a representation of the second multichannel and wherein the multichannel processor is configured to calculate the processed blocks of spectral values for the first multichannel and the processed blocks of spectral values for the second multichannel using the residual signal and a further encoded signal.

12. Decoder of claim 1, wherein the second group of transform kernels comprises one or more transform kernels comprising an even symmetry at the sides or an odd symmetry at the sides of the transform kernel.

13. Decoder of claim 1, wherein the second group of transform kernels comprises an inverse MDCT-II transform kernel or an inverse MDST-II transform kernel, wherein the inverse MDCT-II transform kernel shows an even symmetry at a left side and an even symmetry at a right side, and a synthesized signal is not inverted at any side during signal fold-out of the transform, or wherein the inverse MDST-II transform kernel exhibits an odd symmetry at a left side and an odd symmetry at a right side, and a synthesized signal is inverted at the sides during signal fold-out of the transform.

14. Decoder of claim 1, wherein the joint multichannel processing technique comprises a joint stereo processing or a joint processing of more than two channels, and wherein a multichannel signal comprises two channels or more than two channels.

15. Method of decoding an encoded audio signal, the method comprising:

spectrum-time converting successive blocks of spectral values into successive blocks of time values; and overlapping and adding successive blocks of time values to acquire decoded audio values, receiving a control information and signal-adaptively changing, in response to the control information, in the spectrum-time converting, between a transform kernel of a first group of transform kernels comprising one or more transform kernels, and a transform kernel of a second group of transform kernels comprising one or more transform kernels, wherein the transform kernel of the first group of transform kernels and the transform kernel of the second group of transform kernels are based on the following equation:

$$x_{i,n} = C\sum_{k=0}^{M-1} spec[i][k]cs\left(\frac{2\pi}{N}(n+n_0)(k+k_0)\right),$$

wherein $x_{i,n}$ is a time domain output, C is a constant parameter, N is a time-window length, spec are spectral values comprising M values for a block, i is a time block index, k is a spectral index, n is a time index, no is a constant parameter being an integer number or zero, and cs( . . . ) indicates a cosine function or a sine function, and wherein $k_0$ and cs( . . . ) are chosen signal-adaptively.

16. A non-transitory digital storage medium having a computer program stored thereon to perform, when said computer program is run by a computer, the method of decoding an encoded audio signal, the method comprising:

spectrum-time converting successive blocks of spectral values into successive blocks of time values;

overlapping and adding successive blocks of time values to acquire decoded audio values; and receiving a control information and signal-adaptively changing, in response to the control information, in the spectrum-time converting, between a transform kernel of a first group of transform kernels comprising one or more transform kernels, and a transform kernel of a second group of transform kernels comprising one or more transform kernels, wherein the transform kernel of the first group of transform kernels and the transform kernel of the second group of transform kernels is based on the following equation:

$$x_{i,n} = C\sum_{k=0}^{M-1} spec[i][k]cs\left(\frac{2\pi}{N}(n+n_0)(k+k_0)\right),$$

wherein $x_{i,n}$ is a time domain output, C is a constant parameter, N is a time-window length, spec are spectral values comprising M values for a block, i is a time block index, k is a spectral index, n is a time index, $n_o$ is a constant parameter being an integer number or zero, and cs( . . . ) indicates a cosine function or a sine function, and wherein $k_0$ and cs( . . . ) are chosen signal-adaptively.

* * * * *